US008643663B2

(12) United States Patent
Zillman et al.

(10) Patent No.: US 8,643,663 B2
(45) Date of Patent: Feb. 4, 2014

(54) EFFICIENT RADIAL GRADIENT FILLS

(75) Inventors: Richard James Zillman, Artarmon (AU); Kevin John Moore, North Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 127 days.

(21) Appl. No.: 12/871,651

(22) Filed: Aug. 30, 2010

(65) Prior Publication Data
US 2011/0050696 A1 Mar. 3, 2011

(30) Foreign Application Priority Data

Aug. 31, 2009 (AU) ................................ 2009212881

(51) Int. Cl.
G09G 5/02 (2006.01)
(52) U.S. Cl.
USPC ........................... 345/589; 345/592; 345/591
(58) Field of Classification Search
None
See application file for complete search history.

(56) References Cited

U.S. PATENT DOCUMENTS

| | | | | |
|---|---|---|---|---|
| 5,594,846 A * | 1/1997 | Donovan | ...................... | 345/582 |
| 5,751,290 A * | 5/1998 | Lee et al. | ...................... | 345/421 |
| 6,266,044 B1 * | 7/2001 | Liguori | ......................... | 345/589 |
| 6,313,840 B1 * | 11/2001 | Bilodeau et al. | ............. | 345/423 |
| 6,784,896 B1 * | 8/2004 | Perani et al. | ................... | 345/589 |
| 6,870,954 B1 * | 3/2005 | Gupta | .......................... | 382/162 |
| 6,879,327 B1 * | 4/2005 | Mathur et al. | ................ | 345/589 |
| 7,304,648 B2 * | 12/2007 | Beaumont et al. | ............ | 345/589 |
| 8,175,384 B1 * | 5/2012 | Wang | ............................. | 382/173 |
| 2002/0130882 A1 * | 9/2002 | Kaskel | ........................... | 345/589 |
| 2003/0038818 A1 * | 2/2003 | Tidwell | ......................... | 345/611 |
| 2003/0151611 A1 * | 8/2003 | Turpin et al. | .................. | 345/589 |
| 2004/0164992 A1 * | 8/2004 | Gangnet et al. | ............... | 345/591 |
| 2005/0017984 A1 * | 1/2005 | Lawther et al. | ............... | 345/589 |
| 2006/0176304 A1 * | 8/2006 | Ji | .................................... | 345/426 |
| 2007/0268304 A1 * | 11/2007 | Hsu | ................................ | 345/592 |
| 2008/0122858 A1 * | 5/2008 | Wilensky | ...................... | 345/592 |
| 2008/0198175 A1 * | 8/2008 | Sun et al. | ...................... | 345/629 |
| 2009/0195549 A1 * | 8/2009 | Park | .............................. | 345/589 |

FOREIGN PATENT DOCUMENTS

| | | |
|---|---|---|
| AU | 2005201375 | 10/2006 |
| AU | 2006225320 | 4/2008 |

* cited by examiner

*Primary Examiner* — James A Thompson
*Assistant Examiner* — Jason Pringle-Parker
(74) *Attorney, Agent, or Firm* — Fitzpatrick, Cella, Harper & Scinto

(57) ABSTRACT

Disclosed is a method of rendering a radial gradient blend defined by a gradient function. The method identifies respective first and second radial limits for a point of the radial gradient blend, the respective first and second radial limits having known blend values and receives an estimated value of the gradient function for the point. The method determines a direction from the estimated value to an ideal value, wherein the ideal value is a value of the gradient function for the point and modifies the estimated value, based on the direction of the ideal value. The method checks the ideal value is within a predetermined threshold of the estimated value and stores a determined blend value for the point by interpolating between the known blend values of the respective first and second radial limits on the basis of the modified estimated value of the gradient function, to render the radial gradient blend.

13 Claims, 23 Drawing Sheets

US 8,643,663 B2

EFFICIENT RADIAL GRADIENT FILLS

REFERENCE TO RELATED PATENT APPLICATION

This application claims the benefit under 35 U.S.C. §119 of the filing date of Australian Patent Application No. 2009212881, filed Aug. 31, 2009, hereby incorporated by reference in its entirety as if fully set forth herein.

TECHNICAL FIELD

The invention relates to computer graphic pixel rendering systems and, in particular, to a method and apparatus for rendering a radial gradient blend. The invention also relates to a computer program product including a computer readable medium having recorded thereon a computer program for rendering a radial gradient blend.

BACKGROUND

Modern computer graphics authoring systems such as Adobe Illustrator™ provide an artist with the ability to fill a display object using a variety of fill styles. A radial gradient blend is one such fill style. An example of a radial gradient blend is shown in FIG. 1.

A radial gradient blend display object is an object having enclosed pixels that are filled, or shaded, such that each pixel color value is dependent on its position relative to a focal point contained within the bounds of the object.

One method of generating a radial gradient blend consists of rendering a sequence of concentric circles of diminishing radii where the color of each successive circle is the color desired for the portion of a blend region whose distance from the focal point is equal to the radius of that circle. The smaller circles are rendered over the preceding circles, with each successive circle occluding the preceding circle except for an annulus created by the difference of the two circles' radii. A crude example of a radial gradient blend rendered by this method is shown in FIG. 5. The radial gradient blend in the particular example of FIG. 5 consists of six differently colored circles 510-560.

The rendering method described above is inefficient because it creates a large amount of "overdraw". "Overdraw" is a term used in computer graphics to describe a situation where a set of pixels is rendered to an initial color and then rendered to a different color (possibly multiple times) before being displayed. This is inherently inefficient because only the final rendered color of a pixel affects how the pixel is displayed—all rendering operations prior to the final one were wasted effort. In a typical implementation that uses, for instance, 256 differently colored circles, the outer most band of the blend would have no overdraw but each inner band would have successively more overdraw, culminating in the innermost circle which would be overdrawn 255 times. The above prior art method is also inefficient as it involves the processing of many edges. Considering again a typical implementation that uses 256 circles, the number of edges to be processed by the rendering system will be approximately 256 times the number of edges required to simply mark the boundary of the blend.

SUMMARY

The present disclosure makes use of a decision variable to determine the gradient for each pixel without the use of a square root or look-up table required by conventional methods.

According to a first aspect of the present disclosure, there is provided a method of rendering a radial gradient blend defined by a gradient function, the method comprising;

identifying respective first and second radial limits for a point of the radial gradient blend, the respective first and second radial limits having known blend values;

receiving an estimated value of the gradient function for the point;

determining a direction from the estimated value to an ideal value, wherein the ideal value is a value of the gradient function for the point;

modifying the estimated value, based on the direction of the ideal value;

checking the ideal value is within a predetermined threshold of the estimated value; and storing a determined blend value for the point by interpolating between the known blend values of the respective first and second radial limits on the basis of the modified estimated value of the gradient function, to render the radial gradient blend.

According to another aspect of the present disclosure there is provided a method of determining a radial gradient blend defined by a gradient function, the method comprising:

identifying respective first and second radial limits for a point of the radial gradient blend, the respective first and second radial limits having known blend values;

receiving an estimated value of the gradient function for the point;

determining a direction from the estimated value to an ideal value, wherein the ideal value is a value of the gradient function for the point;

modifying the estimated value, based on the direction of the ideal value;

checking the ideal value is within a predetermined threshold of the estimated value; and determining and storing a resultant blend value for the point by modifying one of the known blend values of the respective first and second radial limits on the basis of the modified estimated value of the gradient function.

Other aspects are also disclosed.

BRIEF DESCRIPTION OF THE DRAWINGS

Some aspects of the prior art and at least one embodiment of the present invention will now be described with reference to the drawings, in which.

DETAILED DESCRIPTION INCLUDING BEST MODE

It is to be noted that the discussions contained in the "Background" section and that above relating to prior art arrangements relate to discussions of documents or devices which form public knowledge through their respective publication and/or use. Such should not be interpreted as a representation by the present inventor(s) or the patent applicant that such documents or devices in any way form part of the common general knowledge in the art.

Hardware Implementation

Figure 20:
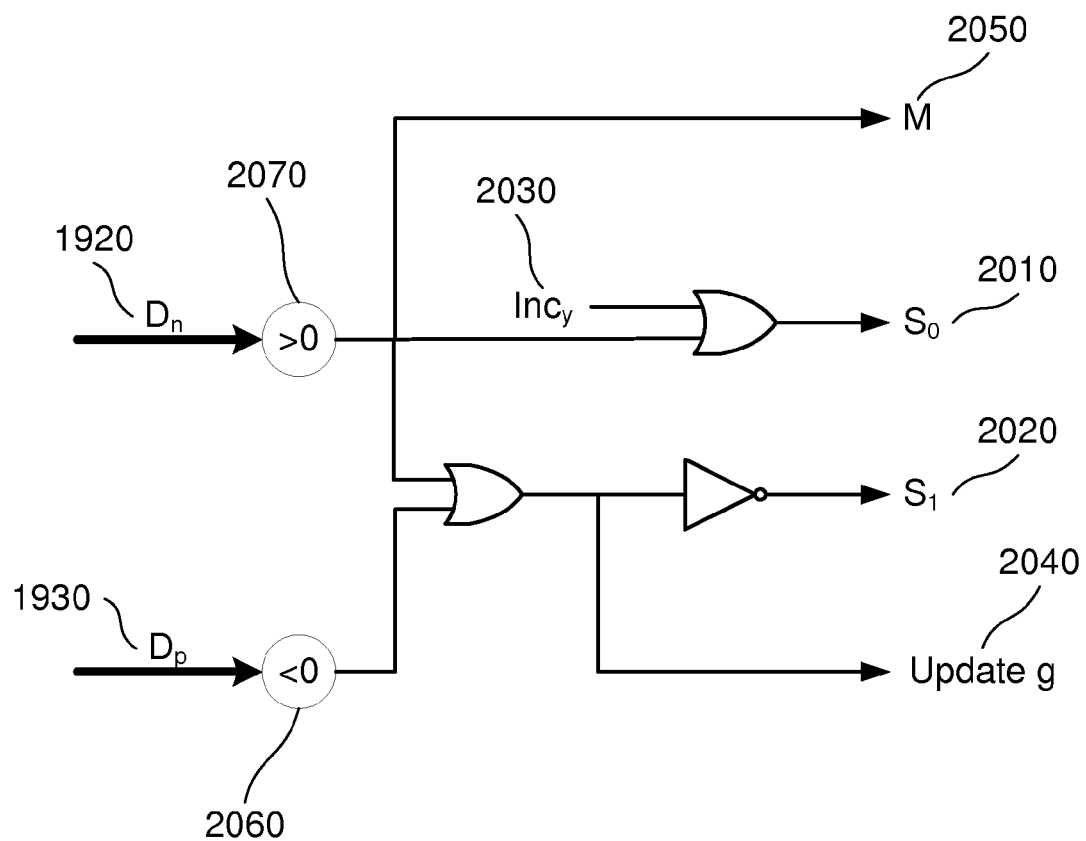
FIG. 20 shows another implementation of the 'Control' block of FIG. 9, for use with the finite differences method of rendering a radial gradient blend.
Figure 21A:
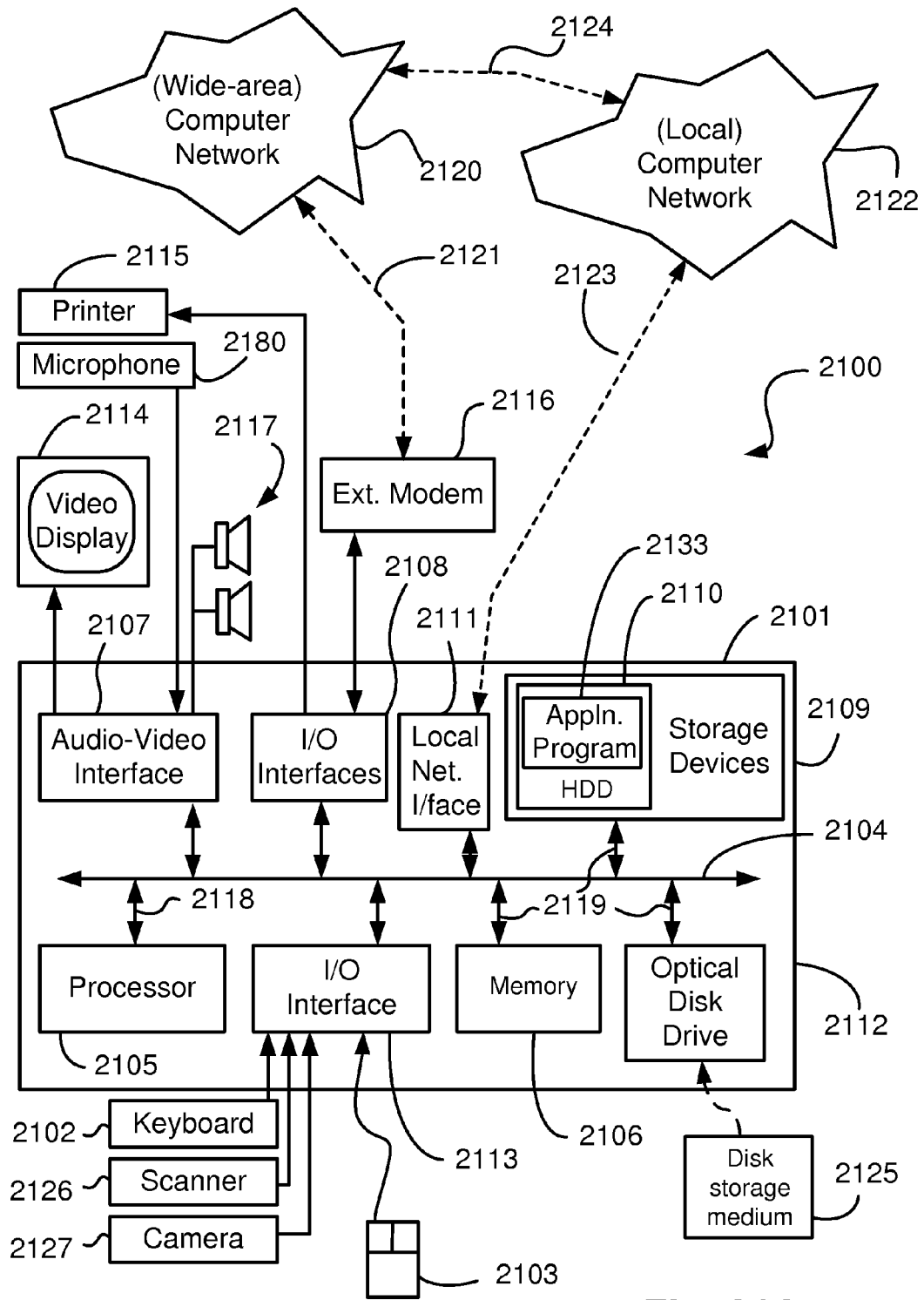
FIGS. 21A and 21B form a schematic block diagram of a general purpose computer system upon which the arrangements described can be practiced.
Figure 21B:
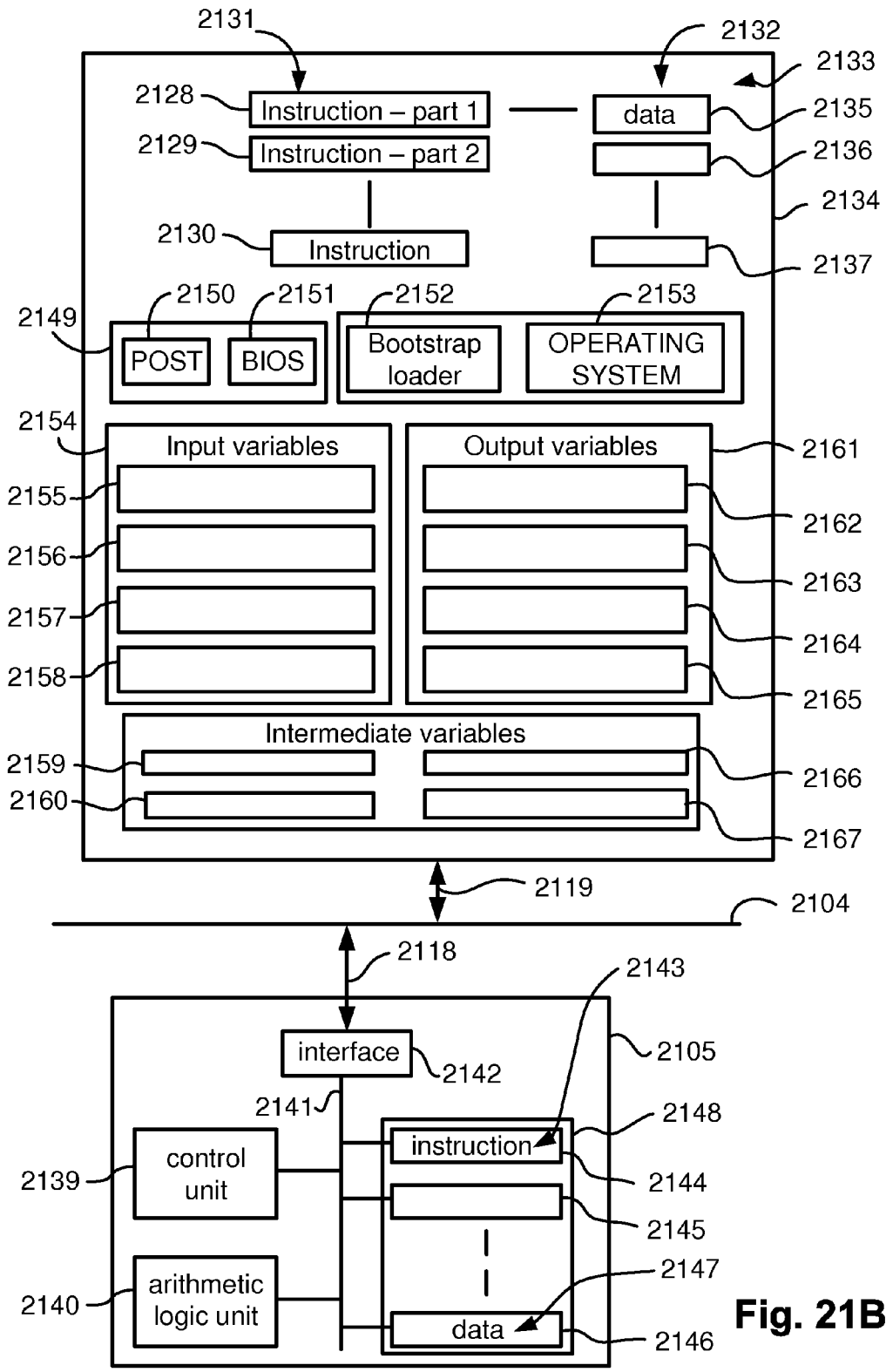

A method 1300 for rendering of a radial gradient blend will be described in detail further in the text with reference to FIG. 13. The computational steps associated with the method 1300 can be effected in dedicated electronic devices, at least some aspects of which are discussed with reference to FIGS. 6, 7, 9 to 12, 14 and 18 to 20. However, at least some steps associated with the discussed methods and implementations (see FIGS. 8, 13, 15 and 16) can also be performed on a standard computer system. FIGS. 21A and 21B collectively form a schematic block diagram of a general purpose computer system 2100 by which such steps can be computer-implemented.

As seen in FIG. 21A, the computer system 2100 is formed by a computer module 2101, input devices such as a keyboard 2102, a mouse pointer device 2103, a scanner 2126, a camera 2127, and a microphone 2180, and output devices including a printer 2115, a display device 2114 and loudspeakers 2117. An external Modulator-Demodulator (Modem) transceiver device 2116 may be used by the computer module 2101 for communicating to and from a communications network 2120 via a connection 2121. The network 2120 may be a wide-area network (WAN), such as the Internet or a private WAN. Where the connection 2121 is a telephone line, the modem 2116 may be a traditional "dial-up" modem. Alternatively, where the connection 2121 is a high capacity (e.g.: cable) connection, the modem 2116 may be a broadband modem. A wireless modem may also be used for wireless connection to the network 2120.

The computer module 2101 typically includes at least one processor unit 2105, and a memory unit 2106 for example formed from semiconductor random access memory (RAM) and semiconductor read only memory (ROM). The module 2101 also includes an number of input/output (I/O) interfaces including an audio-video interface 2107 that couples to the video display 2114, loudspeakers 2117 and microphone 2180, an I/O interface 2113 for the keyboard 2102, mouse 2103, scanner 2126, camera 2127 and optionally a joystick (not illustrated), and an interface 2108 for the external modem 2116 and printer 2115. In some implementations, the modem 2116 may be incorporated within the computer module 2101, for example within the interface 2108. The computer module 2101 also has a local network interface 2111 which, via a connection 2123, permits coupling of the computer system 2100 to a local computer network 2122, known as a Local Area Network (LAN). As also illustrated, the local network 2122 may also couple to the wide network 2120 via a connection 2124, which would typically include a so-called "firewall" device or device of similar functionality. The interface 2111 may be formed by an Ethernet™ circuit card, a Bluetooth™ wireless arrangement or an IEEE 802.11 wireless arrangement.

The interfaces 2108 and 2113 may afford either or both of serial and parallel connectivity, the former typically being implemented according to the Universal Serial Bus (USB) standards and having corresponding USB connectors (not illustrated). Storage devices 2109 are provided and typically include a hard disk drive (HDD) 2110. Other storage devices such as a floppy disk drive and a magnetic tape drive (not illustrated) may also be used. An optical disk drive 2112 is typically provided to act as a non-volatile source of data. Portable memory devices, such optical disks (e.g.: CD-ROM, DVD), USB-RAM, and floppy disks for example may then be used as appropriate sources of data to the system 2100.

The components 2105 to 2113 of the computer module 2101 typically communicate via an interconnected bus 2104 and in a manner which results in a conventional mode of operation of the computer system 2100 known to those in the relevant art. Examples of computers on which the described arrangements can be practised include IBM-PC's and compatibles, Sun Sparc stations, Apple Mac™ or alike computer systems evolved therefrom.

At least some steps of the discussed method 1300 of the present disclosure may be implemented using the computer system 2100 wherein selected processes of some of the figures, to be described, may be implemented as one or more software application programs 2133 executable within the computer system 2100. In particular, at least some of the steps illustrated in FIGS. 8, 13, 15 and 16 can be effected by instructions 2131 in the software 2133 that are carried out within the computer system 2100. The software instructions 2131 may be formed as one or more code modules, each for performing one or more particular tasks. The software may also be divided into two separate parts, in which a first part and the corresponding code modules performs the respective steps or methods and a second part and the corresponding code modules manage a user interface between the first part and the user.

The software 2133 is generally loaded into the computer system 2100 from a computer readable medium, and is then typically stored in the HDD 2110, as illustrated in FIG. 21A, or the memory 2106, after which the software 2133 can be executed by the computer system 2100. In some instances, the application programs 2133 may be supplied to the user encoded on one or more CD-ROM 2125 and read via the corresponding drive 2112 prior to storage in the memory 2110 or 2106. Alternatively the software 2133 may be read by the computer system 2100 from the networks 2120 or 2122 or loaded into the computer system 2100 from other computer readable media. Computer readable storage media refers to any non-transitory tangible storage medium that participates in providing instructions and/or data to the computer system 2100 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 2101. Examples of transitory intangible computer readable transmission media that may also participate in the provision of software, application programs, instructions and/or data to the computer module 2101 include transitory radio or infra-red transmission channels as well as a network connection to another computer or networked device, and the Internet or Intranets including e-mail transmissions and information recorded on Websites and the like.

The second part of the application programs 2133 and the corresponding code modules mentioned above may be executed to implement one or more graphical user interfaces (GUIs) to be rendered or otherwise reproduced upon the display 2114. Through manipulation of typically the keyboard 2102 and the mouse 2103, a user of the computer system 2100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 2117 and user voice commands input via the microphone 2180.

FIG. 21B is a detailed schematic block diagram of the processor 2105 and a "memory" 2134. The memory 2134 represents a logical aggregation of all the memory devices (including the HDD 2110 and semiconductor memory 2106) that can be accessed by the computer module 2101 in FIG. 21A.

When the computer module 2101 is initially powered up, a power-on self-test (POST) program 2150 executes. The POST program 2150 is typically stored in a ROM 2149 of the semiconductor memory 2106. A program permanently stored in a hardware device such as the ROM 2149 is sometimes referred to as firmware. The POST program 2150 examines hardware within the computer module 2101 to ensure proper functioning, and typically checks the processor 2105, the memory (2109, 2106), and a basic input-output systems software (BIOS) module 2151, also typically stored in the ROM 2149, for correct operation. Once the POST program 2150 has run successfully, the BIOS 2151 activates the hard disk drive 2110. Activation of the hard disk drive 2110 causes a bootstrap loader program 2152 that is resident on the hard disk drive 2110 to execute via the processor 2105. This loads an operating system 2153 into the RAM memory 2106 upon which the operating system 2153 commences operation. The operating system 2153 is a system level application, executable by the processor 2105, to fulfill various high level functions, including processor management, memory management, device management, storage management, software application interface, and generic user interface.

The operating system 2153 manages the memory (2109, 2106) in order to ensure that each process or application running on the computer module 2101 has sufficient memory in which to execute without colliding with memory allocated to another process. Furthermore, the different types of memory available in the system 2100 must be used properly so that each process can run effectively. Accordingly, the aggregated memory 2134 is not intended to illustrate how particular segments of memory are allocated (unless otherwise stated), but rather to provide a general view of the memory accessible by the computer system 2100 and how such is used.

The processor 2105 includes a number of functional modules including a control unit 2139, an arithmetic logic unit (ALU) 2140, and a local or internal memory 2148, sometimes called a cache memory. The cache memory 2148 typically includes a number of storage registers 2144-2146 in a register section. One or more internal buses 2141 functionally interconnect these functional modules. The processor 2105 typically also has one or more interfaces 2142 for communicating with external devices via the system bus 2104, using a connection 2118.

The application program 2133 includes a sequence of instructions 2131 that may include conditional branch and loop instructions. The program 2133 may also include data 2132 which is used in execution of the program 2133. The instructions 2131 and the data 2132 are stored in memory locations 2128-2130 and 2135-2137 respectively. Depending upon the relative size of the instructions 2131 and the memory locations 2128-2130, a particular instruction may be stored in a single memory location as depicted by the instruction shown in the memory location 2130. Alternately, an instruction may be segmented into a number of parts each of which is stored in a separate memory location, as depicted by the instruction segments shown in the memory locations 2128-2129.

In general, the processor 2105 is given a set of instructions which are executed therein. The processor 2105 then waits for a subsequent input, to which it reacts to by executing another set of instructions. Each input may be provided from one or more of a number of sources, including data generated by one or more of the input devices 2102, 2103, data received from an external source across one of the networks 2120, 2122, data retrieved from one of the storage devices 2106, 2109 or data retrieved from a storage medium 2125 inserted into the corresponding reader 2112. The execution of a set of the instructions may in some cases result in output of data. Execution may also involve storing data or variables to the memory 2134.

The disclosed computational steps use input variables 2154 that are stored in the memory 2134 in corresponding memory locations 2155-2158. The computational steps produce output variables 2161 that are stored in the memory 2134 in corresponding memory locations 2162-2165. Intermediate variables may be stored in memory locations 2159, 2160, 2166 and 2167.

The register section 2144-2146, the arithmetic logic unit (ALU) 2140, and the control unit 2139 of the processor 2105 work together to perform sequences of micro-operations needed to perform "fetch, decode, and execute" cycles for every instruction in the instruction set making up the program 2133. Each fetch, decode, and execute cycle comprises:

(a) a fetch operation, which fetches or reads an instruction 2131 from a memory location 2128;

(b) a decode operation in which the control unit 2139 determines which instruction has been fetched; and (c) an execute operation in which the control unit 2139 and/or the ALU 2140 execute the instruction.

Thereafter, a further fetch, decode, and execute cycle for the next instruction may be executed. Similarly, a store cycle may be performed by which the control unit 2139 stores or writes a value to a memory location 2132.

Each step or sub-process in the processes of FIGS. 8, 15, 13 and 16 is associated with one or more segments of the program 2133, and is performed by the register section 2144-2147, the ALU 2140, and the control unit 2139 in the processor 2105 working together to perform the fetch, decode, and execute cycles for every instruction in the instruction set for the noted segments of the program 2133.

The described method may alternatively be implemented in dedicated hardware such as one or more integrated circuits performing the functions or sub functions of method and apparatus for rendering of radially shaped regions of gradated color and reproducing those colors to a display or other output. Such dedicated hardware may include graphic processors, digital signal processors, or one or more microprocessors and associated memories.

Radial Gradient Blend

The rendering of a radial gradient blend involves determination of a blend value at each point of the radial gradient blend. This is an important process for the imaging of the radial gradient blend on imaging devices, such as display monitors, printers etc. There are a number of prior art methods for generating radial gradient blends.

Figure 1:
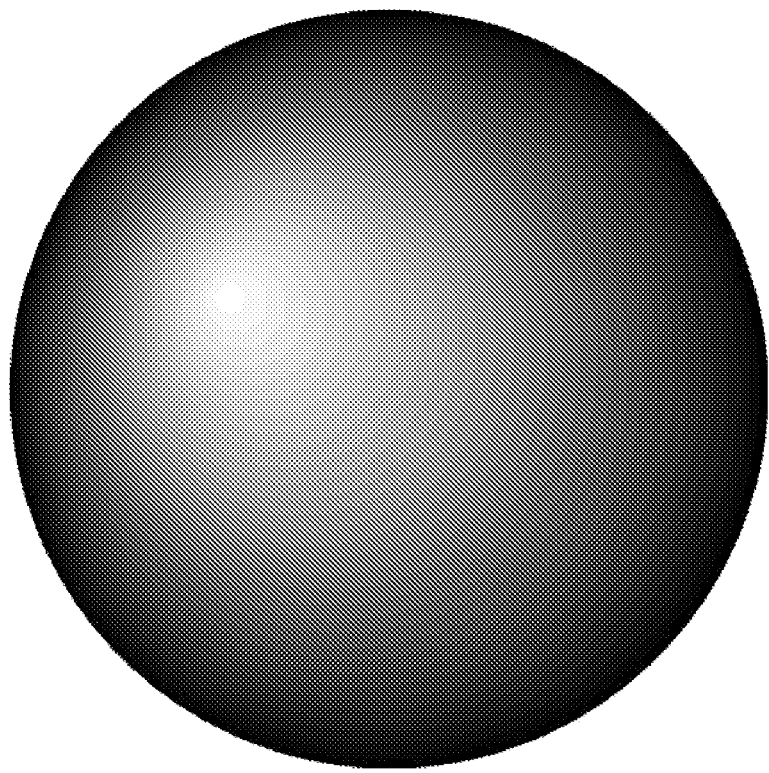
FIG. 1 is an example of a radial gradient blend.
Figure 2:
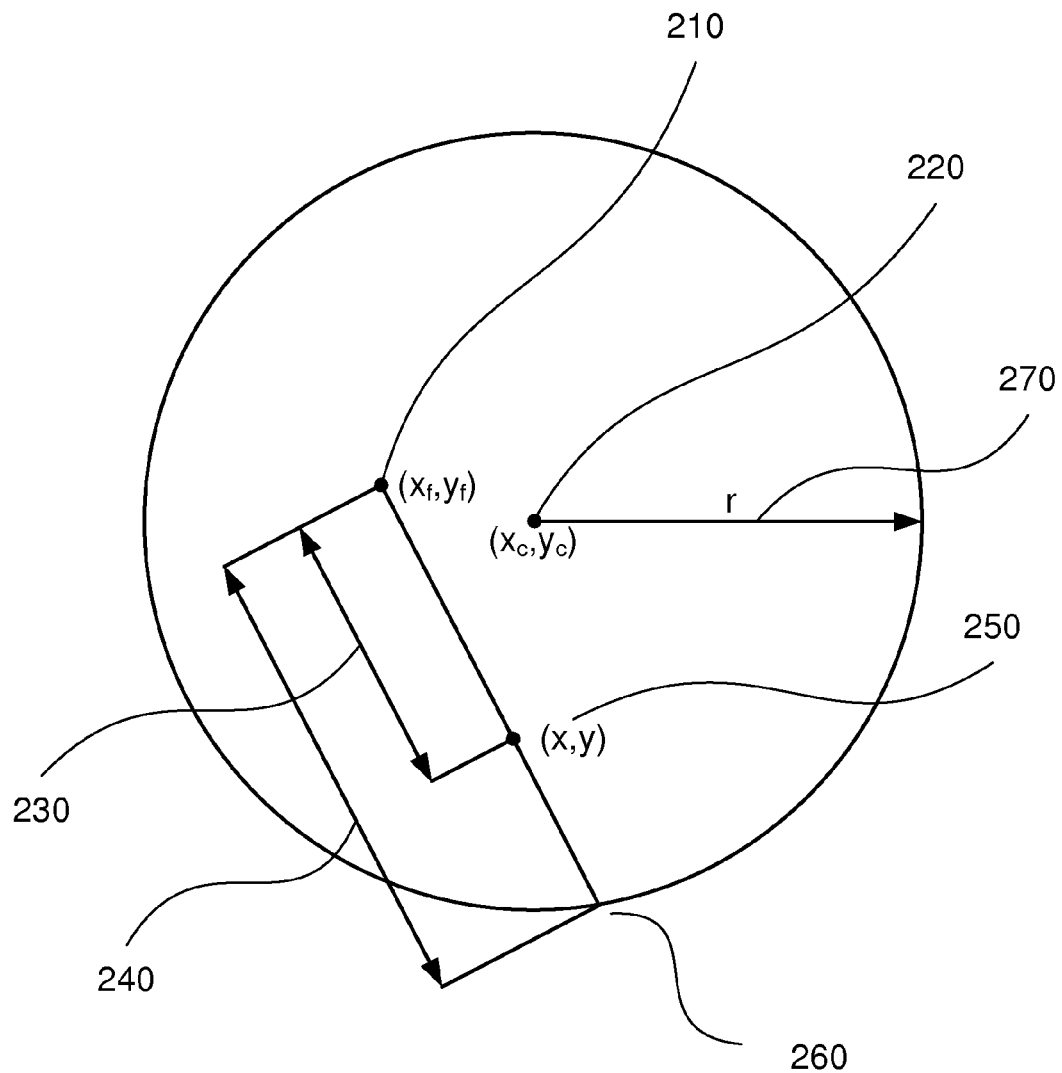
FIG. 2 shows the geometry that defines a radial gradient blend.

FIG. 2 shows the geometry that defines a radial gradient blend by indicating the various points associated with the radial gradient blend and the coordinates of the points. In particular, FIG. 2 shows the focal point $(x_f, y_f)$ 210 and the centre point $(x_c, y_c)$ 220, associated with a radial gradient blend, as well as a current pixel $(x, y)$ 250.

One method of calculating the color at point 250 is to explicitly calculate the ratio of the distance 230 (from the pixel 250 to the radial gradient blend focal point 210) to the length of the line segment 240 (from the focal point 210 to the radius 260, passing through the pixel of interest 250). This ratio is directly associated with the color gradient of the radial gradient blend and is used to interpolate between the known colors of the focal point 210 and at the radius 270.

The above discussed ratio is given by the following function, which will also be referred to as a "gradient function":

$$G(x, y) = \frac{d_1}{d_2} \quad 0 \le G(x, y) \le 1$$

which can be expressed directly as:

$$G(x, y) = \frac{(\Delta x_f \Delta x_{fc} + \Delta y_f \Delta y_{fc}) + \sqrt{r^2(\Delta x_f^2 + \Delta y_f^2) - (\Delta x_f \Delta y_{fc} - \Delta y_f \Delta x_{fc})^2}}{r^2 - (\Delta x_{fc}^2 + \Delta y_{fc}^2)} \quad \text{Eq. 1}$$

where $\Delta x_f = x - x_f, \Delta y_f = y - y_f, \Delta x_{fc} = x_f - x_c$ and $\Delta y_{fc} = y_f - y_c$ From the above equation, the computational expense of calculating a square root per pixel, required by this method, is clear. This computational expense may be reduced by implementing the square root with the use of a look-up table (LUT). However, such method leads to an increased memory usage.

Figure 3:
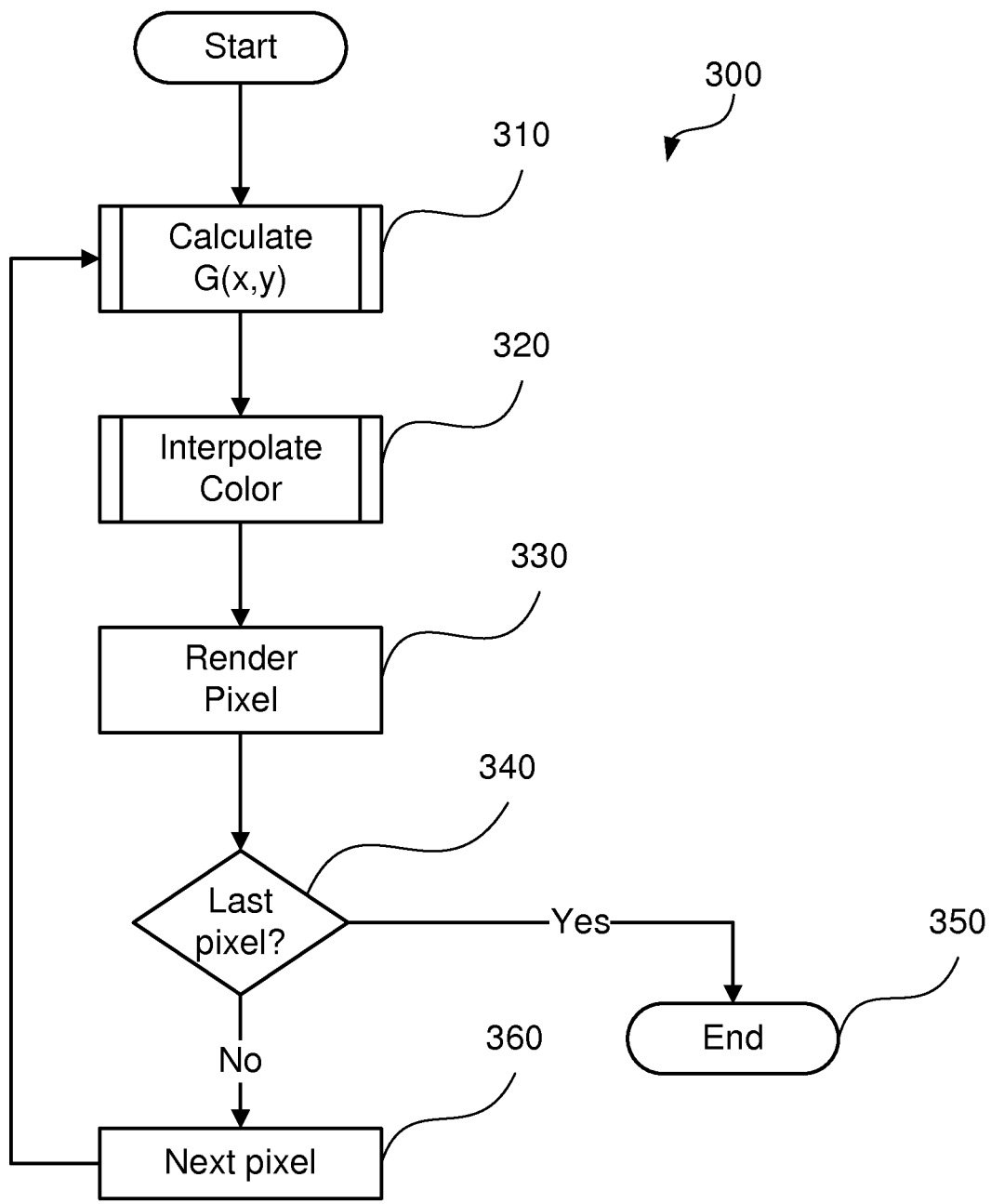
FIG. 3 shows a conventional method of rendering a radial gradient blend.

A conventional method 300 of rendering a radial gradient blend based on the above direct calculation is illustrated in FIG. 3. The method 300 comprises the following steps:

In step 310, the ratio $G(x,y)$ is calculated from Eq. 1;

In step 320, using the calculated ratio $G(x,y)$, the color of the current pixel is determined by interpolating between the color at the focal point 210 and the color at the radius 260;

In step 330, the pixel is output to the imaging device;

In step 340, the processing will continue to step 360, if there are remaining pixels to be rendered. Alternatively, the processing will terminate in step 350;

In step 360, the coordinate of the next pixel is determined and processing returns to step 310.

It is clear from the above description that a direct calculation of a color at a particular point of a radial gradient blend, according to the above direct calculation method, requires that a color at the focal point and a color at the radius are specified. In addition, colors may be specified for intermediate distances from the focal point that are smaller than the radius. These distances define further radial color limits within the radial gradient blend. In this case, any pixel in the radial gradient blend falls in a region that is bounded by an inner color (the color of the inner radial color limit) and an outer color (the color of the outer radial color limit).

The color of each pixel in the radial gradient blend is thus determined by interpolating between the respective inner and outer colors, thereby identifying the inner and outer radial limits associated with each point of the blend.

Figure 4:
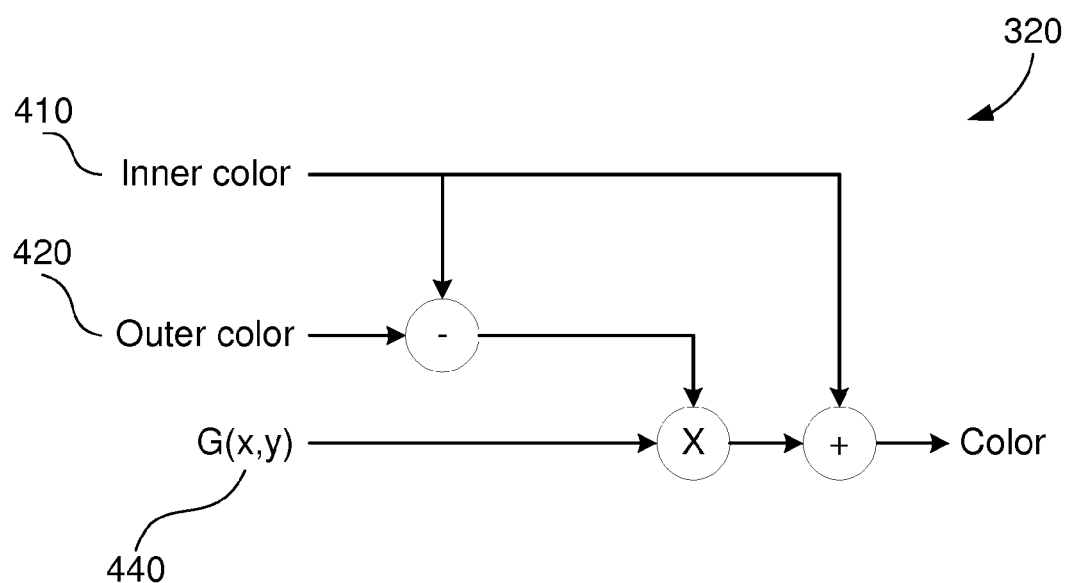
FIG. 4 shows step 320 of FIG. 3 for interpolating between two colors for a single channel.
Figure 5:
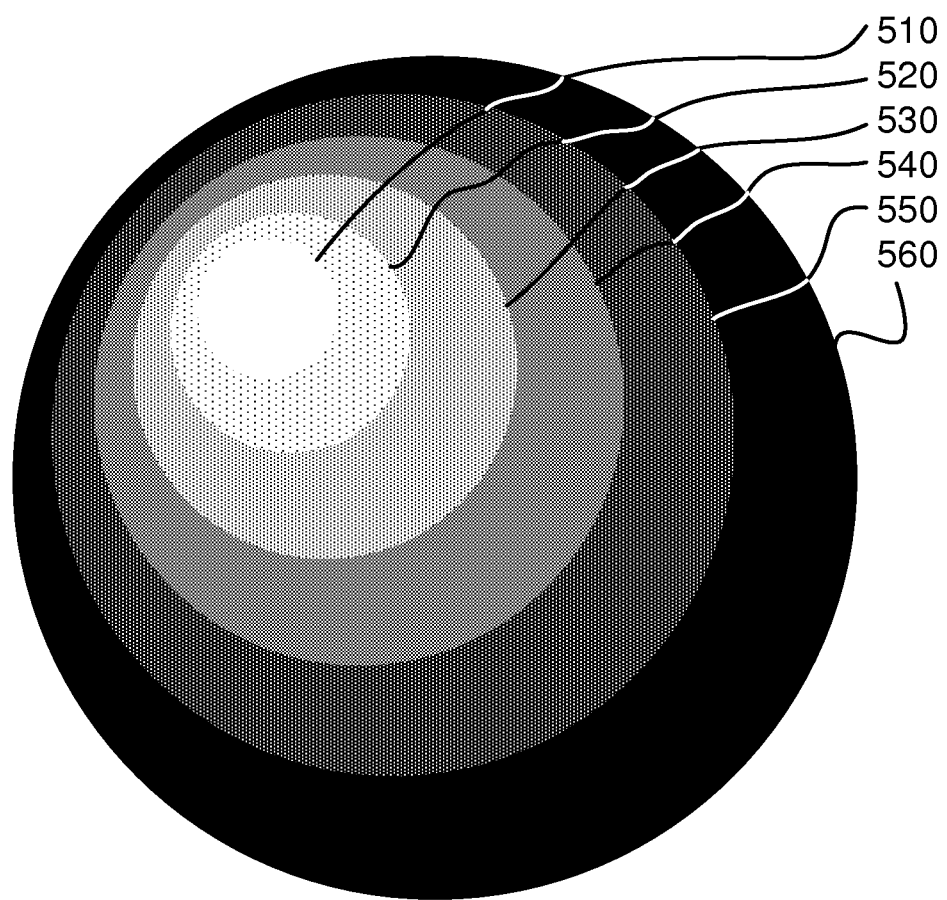
FIG. 5 shows a radial gradient blend illustrating a method of rendering radial gradient blend based on overlapping concentric circles.

FIG. 4 shows a conceptual implementation (for a single channel) of a method 320 for linearly interpolating between two colors 410 and 420, based on the value of $G(x,y)$ 440. The function implemented in FIG. 4 is:

$$C(x,y) = C_{inner} + (C_{outer} - C_{inner})G(x,y) \quad \text{Eq. 2}$$

The radial gradient blend, as defined in Eq. 1, may be determined by an alternative method. This alternative method utilises a polynomial with integer coefficients, hence avoiding the costly square root operation. The following section details the derivation of such an equation and an implementation of said method.

Equation (3) below is derived from Eq. 1 by translating the location of the blend such that it is centred at the origin (0, 0), substituting $G(x,y)$ with g (g being an estimate of $G(x,y)$), and rearranging to give:

$$D(x, y, g) = g - \frac{(\Delta x_f x_f + \Delta y_f y_f) + \sqrt{r^2(\Delta x_f^2 + \Delta y_f^2) - (\Delta x_f y_f - \Delta y_f x_f)^2}}{r^2 - (x_f^2 + y_f^2)}$$ Eq. 3

The variable $D(x,y,g)$ will also be referred to as a "decision variable". As shown by Eq. 3, this variable is indicative of the difference between the estimated value g and the real value of $G(x,y)$. For the ideal case, where g is equal to $G(x,y)$, the decision variable $D(x,y,g)$ is equal to zero. However in the event that g is not equal to $G(x,y)$, the decision variable may be used to determine if the current estimate of $G(x,y)$ is greater or less than the ideal value:

If $g > G(x,y) \Rightarrow D(x,y,g) > 0$

If $g < G(x,y) \Rightarrow D(x,y,g) < 0$

Only the polarity of the decision variable $D(x,y,g)$ is required to determine if the estimate of $G(x,y)$ is greater or smaller than the ideal value. As the decision variable of Eq. 3 requires real number arithmetic, it is desirable to derive a decision variable that requires only integer operations. As a first step, Eq. 1 is scaled by an integer $G_{max}$ such that $0 \leq G(x,y) \leq G_{max}$ to give Eq. 4.

$$G(x, y) = \frac{(\Delta x_f x_f + \Delta y_f y_f) + \sqrt{r^2(\Delta x_f^2 + \Delta y_f^2) - (\Delta x_f y_f - \Delta y_f x_f)^2}}{r^2 - (x_f^2 + y_f^2)} G_{max}$$ Eq. 4

The value of $G_{max}$ is dependent on implementation requirements. Since the value of $G(x,y)$ is generally between 0 and 255 for systems using 8 bits per color channel, a typical value for $G_{max}$ is 255.

From Eq. 4, a decision variable may be alternatively derived by first substituting $G(x,y)=g$, $\Delta x_f = x - x_f$ and $\Delta y_f = y - y_f$, before multiplying through by $(r^2-(x_f^2+y_f^2))$, squaring both sides and rearranging the resultant equation to give:

$D(x,y,g) = \delta(Px^2 + Q(g)x + R(y,g))$  Eq. 5 where $\delta = x_f^2 + y_f^2 - r^2$ $P = G_{max}^2$ $Q(g) = Ag + B$ where $A = 2G_{max} x_f$ $B = -2G_{max}^2 x_f$ $R(y,g) = Cy^2 + Ey^2 + Fgy + Uy + Vg + W$ where $C = G_{max}^2$ $E = \delta$ $F = 2G_{max} y_f$ $U = -2G_{max}^2 y_f$ $V = -2G_{max}(x_f^2 + y_f^2)$ $W = G_{max}^2(x_f^2 + y_f^2)$ As only the polarity of the decision variable is required and, due to the requirement of the focal point being contained within the radius, d of Eq. 5 may be replaced by −1 as $x_f^2 + y_f^2 - r^2 < 0$ to give:

$D(x,y,g) = -(Px^2 + Q(g)x + R(y,g))$  Eq. 6

Figure 6:
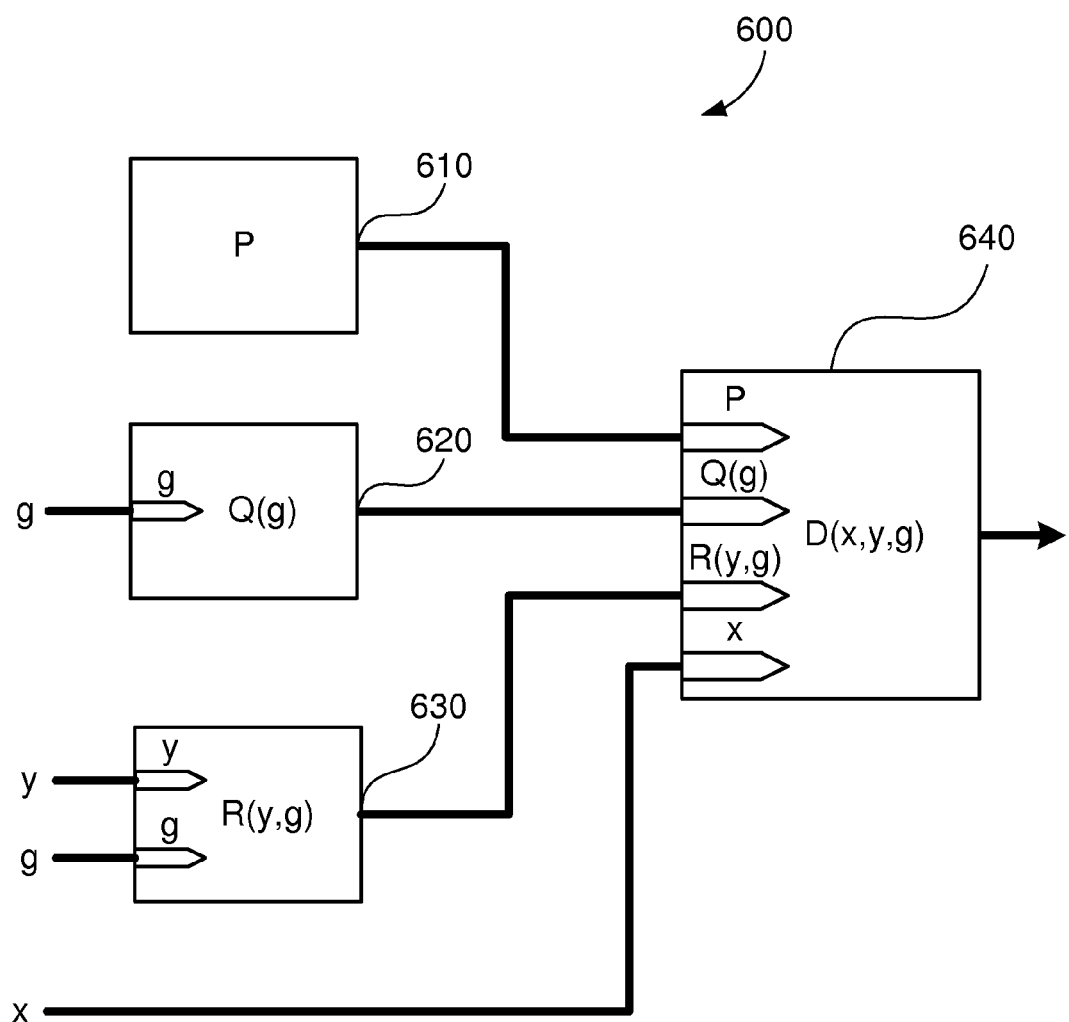
FIG. 6 shows a method of calculating the polynomial decision variable D(x,y,g)

As the decision variable of Eq. 6 is polynomial, it may be evaluated simply, as schematically shown in FIG. 6. The inputs to the evaluation process 600 comprise data associated with the coordinates x and y of the processed pixel, the estimate value of the gradient function and the value of Gmax. The coefficients P, Q(g) and R(y,g) are calculated in steps 610, 620 and 630, respectively, by processor 2105. The processor 2105 then stores the obtained values in memory 2106. The processor 2105 later retrieves the values, in step 640, to calculate $D(x,y,g)$, which is also saved in memory 2105.

Figure 7:
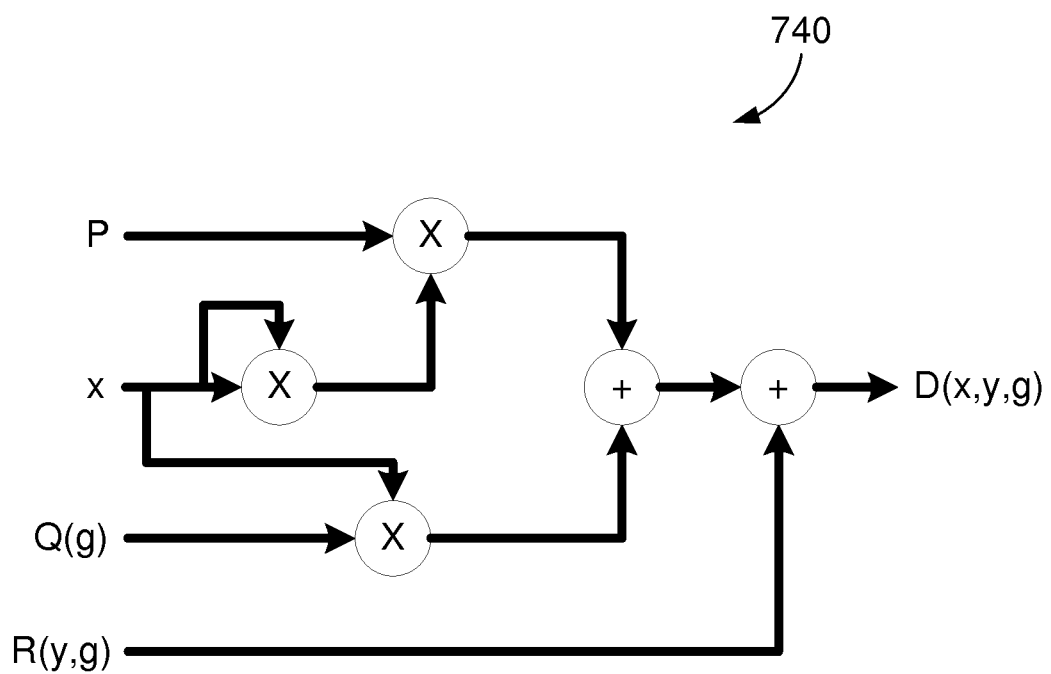
FIG. 7 shows an implementation of the method of FIG. 6.

FIG. 7 shows a schematic diagram of an implementation of the method of FIG. 6 for calculating Eq. 6. The particular implementation shown in FIG. 7 may be a software implementation performed by a dedicated control processor or a general type processor 2105. Alternatively, the implementation shown in FIG. 7 may be hardware based and include a plurality of digital logical units that may form a part of the processor 2105.

$D(x,y,g)$ may be computed efficiently as the coefficients P, A, B, C, E, F, U, V and W are constant for a radial gradient blend.

By evaluating Eq. 6 at values of g that are greater than and less than the current estimate of $G(x,y)$, the relative error of the estimate may be determined and hence corrected. That is done by introducing two decision variables $D_n$ and $D_p$, where Dn is a negative decision variable whose value is ideally negative if the estimated value g is a suitable estimate, while $D_p$ is a positive decision variable with an ideally positive value:

$D_p = D(x,y,g_p)$ $D_n = D(x,y,g_n)$  Eq. 7 where $g_p = g + g_{inc}, g_{inc} > 0$ $g_n = g - g_{dec}, g_{dec} > 0$

Here $g_{inc}$ and $g_{dec}$ are predetermined values with which the estimate g is increased or decreased, respectively.

An evaluation of the decision variables of Eq. 7 gives three possible scenarios:

(1) $D_p < 0$ which implies that $g < G(x,y)$;
(2) $D_n > 0$ which implies that $g > G(x,y)$; and
(3) $D_p = 0$ and $D_n = 0$ Given scenario (1) the estimate g of $G(x,y)$ may be improved by incrementing g by a predetermined amount.

Similarly, for scenario (2), the estimate may be improved by decrementing g by a predetermined amount. For scenario (3), the magnitude of the error between G(x,y) and g, $\epsilon=|G(x,y)-g|$ is therefore bounded such that $0 \leq \epsilon \leq g_{inc}+g_{dec}$. Smaller values for $g_{inc}$ and $g_{dec}$ therefore allow for a more accurate estimation of G(x, y), while larger values of $g_{inc}$ and $g_{dec}$ allow for a faster, but less accurate, estimation. Typically, $g_{inc}$ and $g_{dec}$ are both set to one. Accordingly, g is approximately equal to G(x,y), within the margins of the specified error, associated with the sum $g_{inc}+g_{dec}$. The value of $D_p$ and $D_n$ effectively determine a direction of the ideal value from the estimated value g. In this embodiment the sign of the values $D_p$ and $D_n$ determine the direction of the ideal value from the estimated value. Additionally, the values of $D_p$ and $D_n$ are used to determine that the estimated value g is within a threshold or range of the ideal value. The threshold is set by the range of $G(x, y)-g_{dec}$ to $G(x, y)+g_{inc}$.

Figure 8:
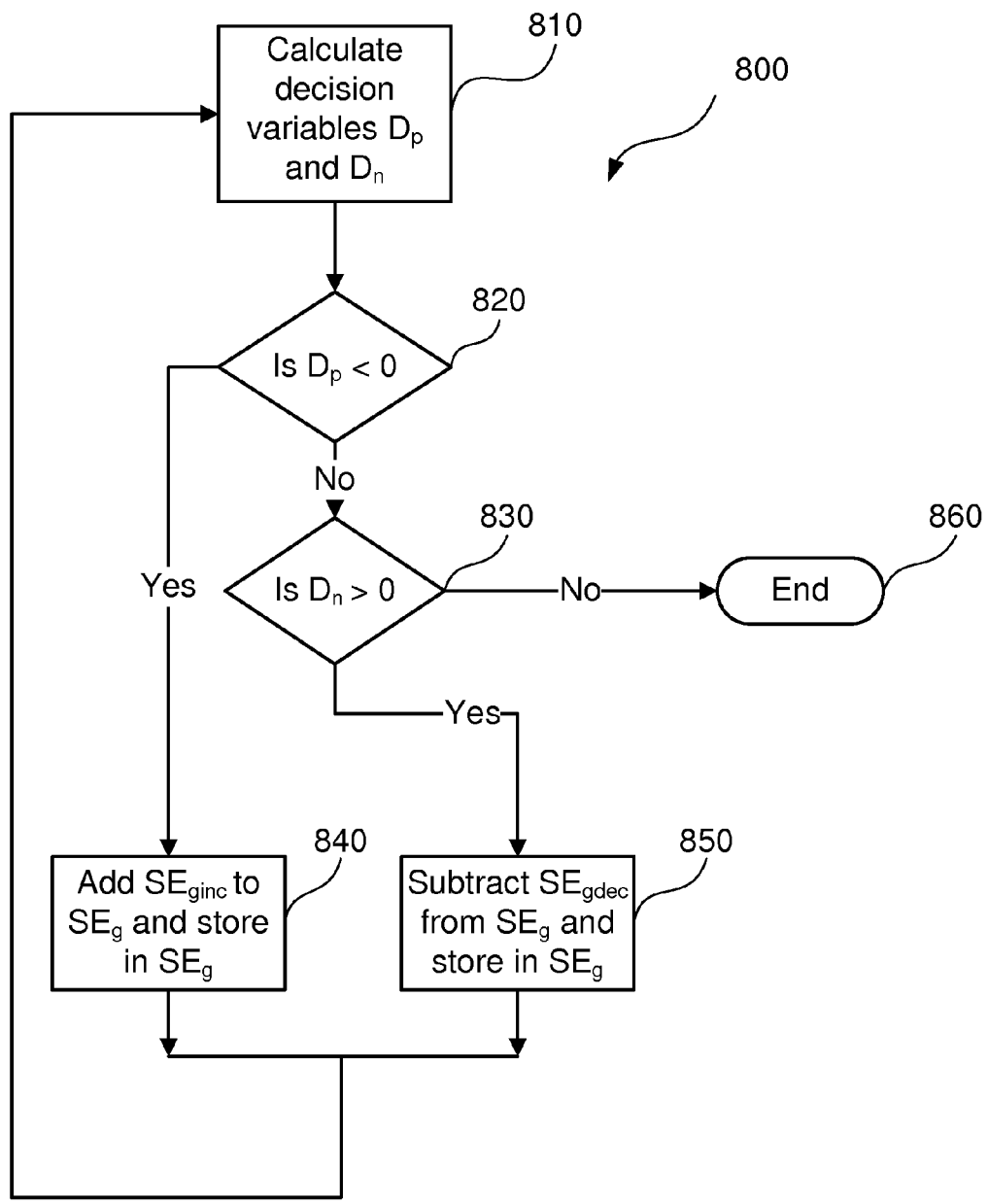
FIG. 8 shows a method of refining an estimate of the gradient G(x,y) for a given coordinate.
Figure 9:
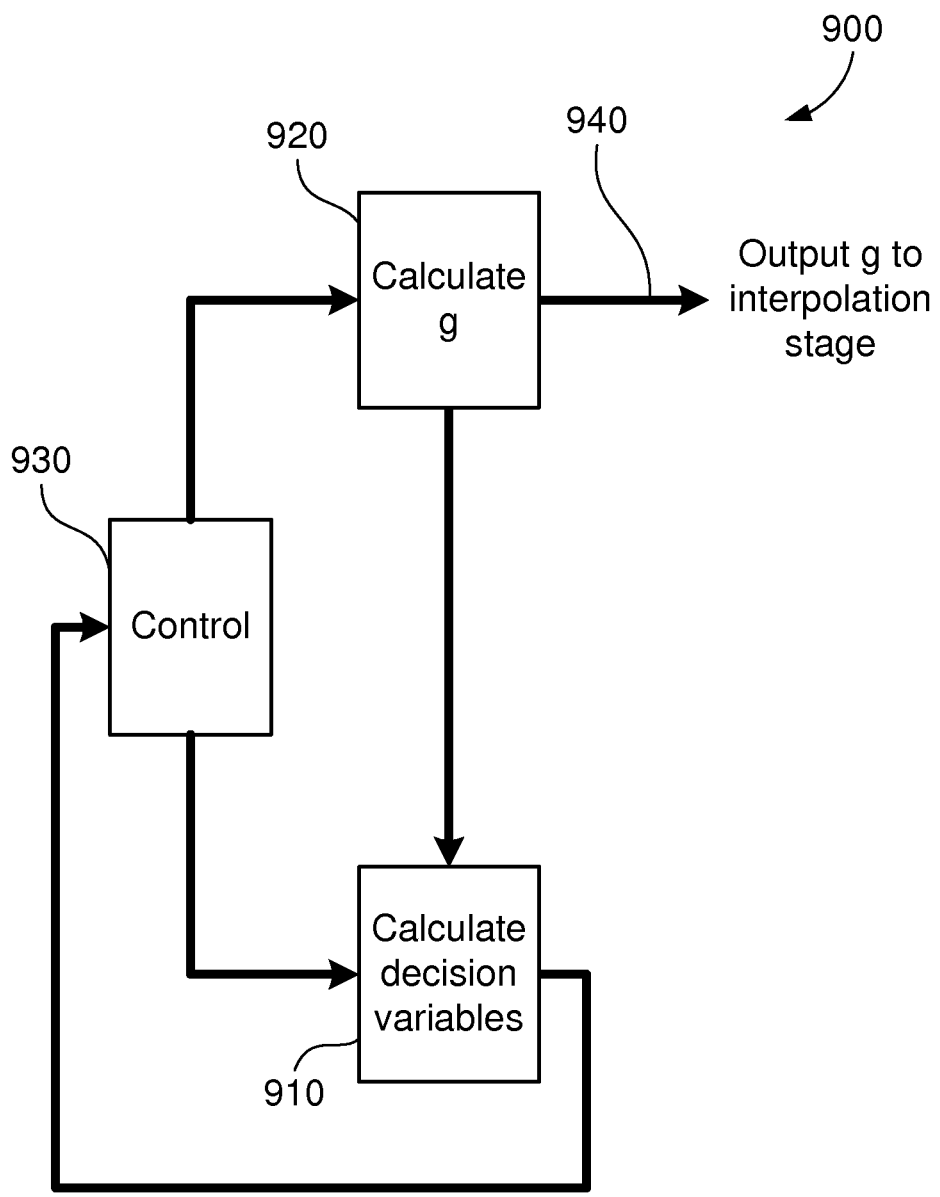
FIG. 9 shows an implementation of the method of FIG. 8.

From the above derivation, a method has been developed for determining G(x,y) by refining an estimate g until the condition of scenario (3) is satisfied. A flow diagram of the method 800 of refining our estimate of the gradient function G(x,y) is shown in FIG. 8. A block diagram of an implementation of the method 800 of FIG. 8 is shown in FIG. 9.

Figure 10:
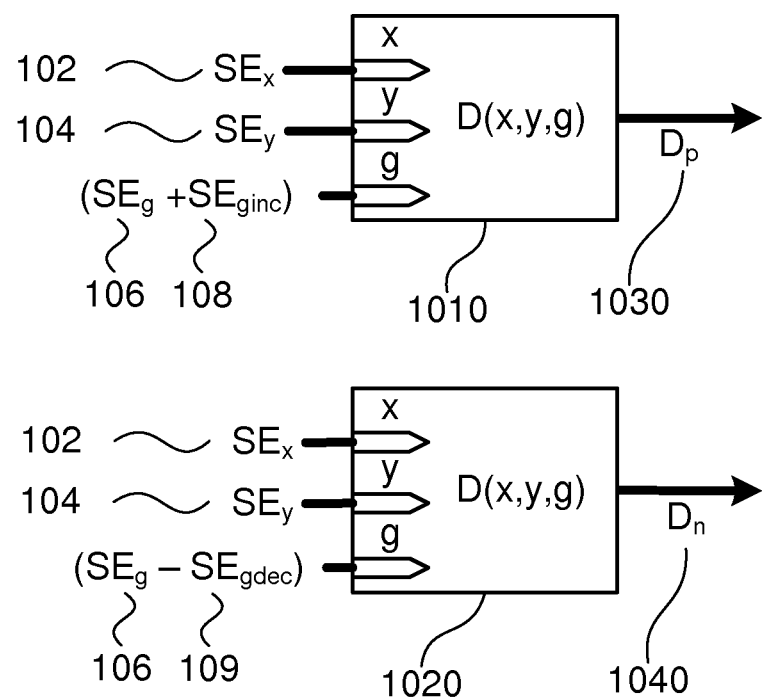
FIG. 10 shows an implementation of the 'Calculate decision variable' block of FIG. 9.
Figure 11:
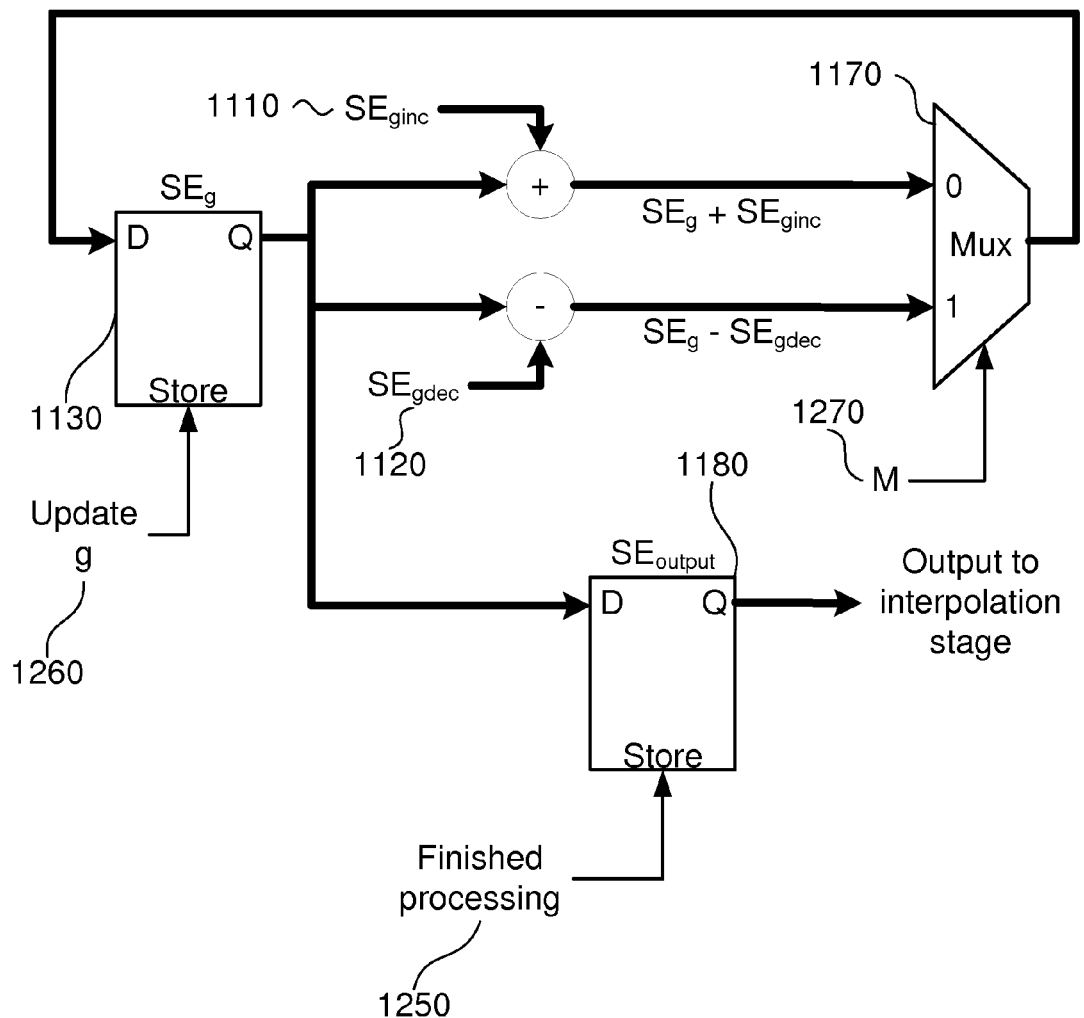
FIG. 11 shows an implementation of the 'Calculate g' block of FIG. 9.
Figure 12:
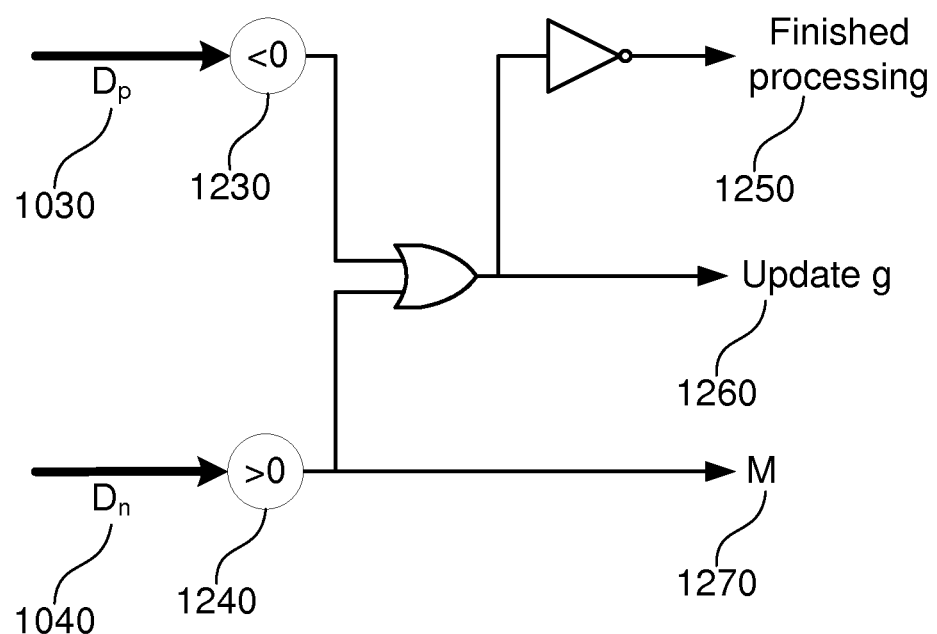
FIG. 12 shows an implementation of the 'Control' block of FIG. 9.

Sample implementations of the 'calculate decision variables' block 910, the 'calculate g' block 920, and the 'control' block 930 are shown in FIG. 10, FIG. 11 and FIG. 12 respectively. Thus, the method of FIG. 8 and its implementation of FIG. 9 will be now explained in more details with reference to elements from the FIGS. 10 to 12. Here it has to be noted again that the particular implementations shown in FIGS. 9 to 12 may be hardware based and include a plurality of digital logical units, as indicated in these figures. These hardware units may form a part of the processor 2105. However, the logical units illustrated in these figures may also be implemented by way of corresponding software modules executed by a dedicated control processor or a general type processor 2105. In the following description it will be assumed that the illustrated logical units are software implemented and executed by the processor 2105.

The input needed for the method 800 is the values for $g_{inc}$ and $g_{dec}$, which are stored in storage elements $SE_{ginc}$ 1110 and $SE_{gdec}$ 1120, respectively. The method 800 comprises the following steps:

In step 810, the processor 2105 calculates decision variables $D_p$ 1030 and $D_n$ 1040, as defined by Eq. 6 and Eq. 7. The calculation is effected by the decision variable software modules 1010 and 1020 of FIG. 10. Elements 102 and 104 ($SE_x$ and $SE_y$, respectively) represent the storage elements storing the values for the current coordinates x and y positions. These values, together with the values of the $SE_g$ and the $SE_{ginc}$, obtained from the storage elements 106 and 108, form the input needed for the calculation of $D_p$ 1030. Similarly, the values of $SE_x$, $SE_y$, $SE_g$ and $SE_{ginc}$, obtained from storage elements 102, 104, 106 and 109, form the input needed for the calculation of $D_n$ 1040. The storage elements 102 to 109 are typically part of memory 2106. The inputs from the storage elements 102 to 109 are processed by processor 2105 and the resulting values for the decision variables $D_p$ (1030) and $D_n$ (1040) are stored in memory 2106.

In step 820, if $D_p$ is less than zero then the processor 2105 continues processing to step 840, else the processor 2105 continues processing to step 830. The comparison is implemented by comparator software module 1230 of FIG. 12, executed by the processor 2105.

In step 830, if $D_n$ is greater than zero then the processor 2105 continues processing to step 850. Else the processor 2105 terminates the processing at 860, leaving and thereby maintaining the current estimate g unchanged. This comparison is implemented by comparator software module 1240 of FIG. 12, executed by processor 2105. Processing for the current pixel terminates when comparator software modules 1230 and 1240 output false, indicating that $D_p=0$ and $D_n=0$ and hence the magnitude of the error between G(x,y) and g, e, is within the tolerance. This is indicated by signal 1250 of FIG. 12, which causes the processor 2105 to store the current value of g in $SE_{output}$ 1180.

In step 840, the values stored in $SE_g$ and $SE_{ginc}$ are added together, by the processor 2105, which then saves the result back to $SE_g$ and returns the processing to step 810.

In step 850, the value stored in $SE_{gdec}$ is subtracted from the value of $SE_g$ by the processor 2105, which then saves the result back to $SE_g$ and returns the processing to step 810.

The selection of the outputs from steps 840 and 850 can be implemented by a multiplexer software module 1170, shown in FIG. 11. The multiplexer module 1170 is controlled by signal 1270. The signal 1270 is generated by an arrangement shown in FIG. 12. If signal 1270 is true, processor 2105 selects $SE_g-SE_{gdec}$ and writes the value back to $SE_g$ 1130. Else, if the comparator software module outputs false, the processor 2105 selects $SE_g+SE_{ginc}$ and writes the value back to $SE_g$ 1130. The signal 1260 (see FIG. 12) for storing the update approximation to G(x,y) is true when either of the comparator software modules 1230 or 1240 outputs true. The sum of $SE_g$ and $SE_{ginc}$ and the difference between $SE_{gdec}$ and $SE_g$ are calculated by hardware implemented digital adders or by equivalent adder software modules executed by the processor 2105.

Figure 13:
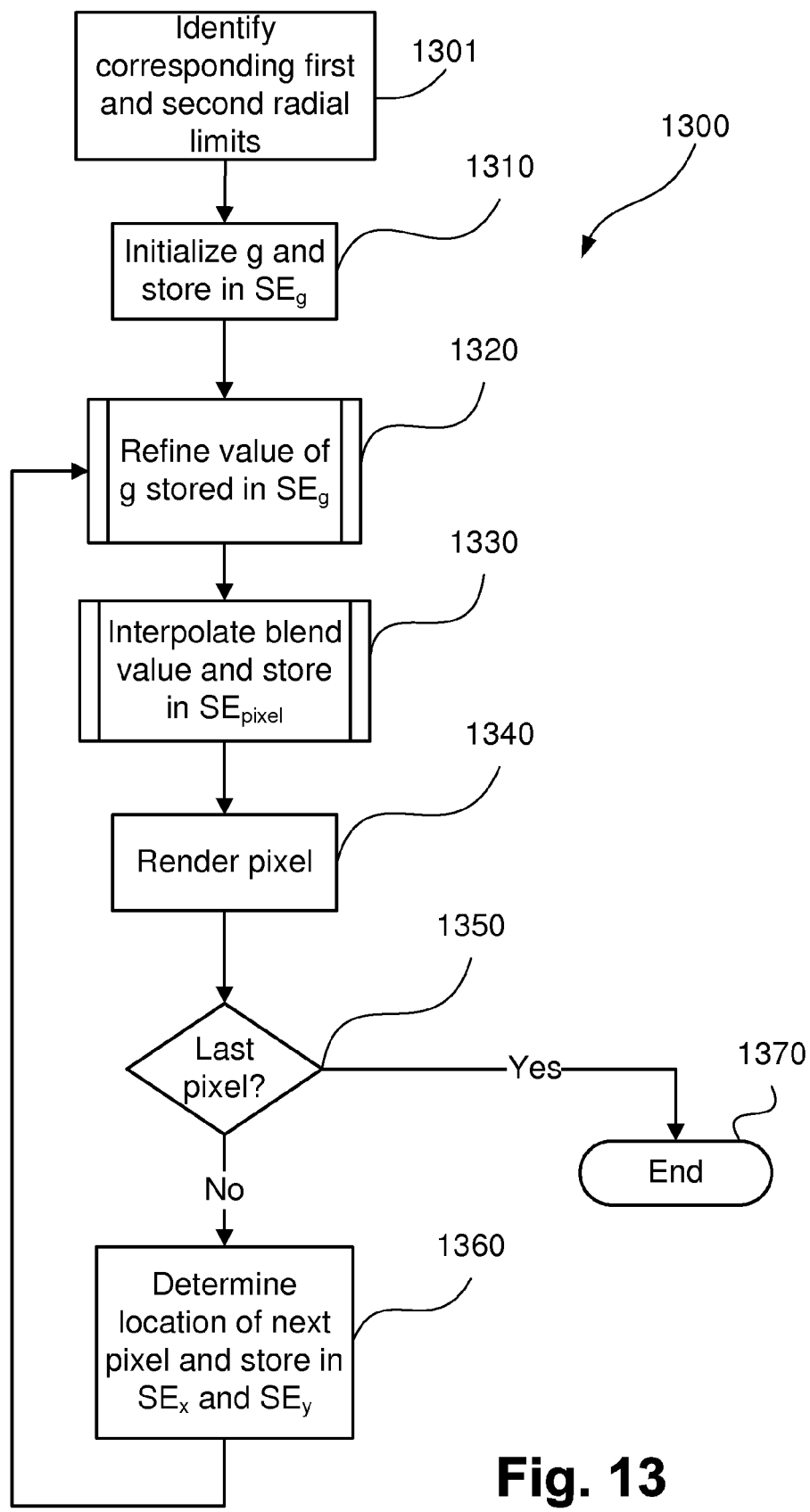
FIG. 13 shows a method of rendering a radial gradient blend.

In view of the above described methodology of determining the value of G(x,y), without the computational expense of Eq. 1, the method of rendering a radial gradient blend of FIG. 3 can be modified, as shown in FIG. 13.

A value for the current coordinates x and y of each pixel to be processed are first stored in storage elements $SE_x$ and $SE_y$, by a control processor, which may be associated with processor 2105. These values, together with a value for $G_{max}$, stored in storage element $SE_{gmax}$, serve as input to the method 1300 of FIG. 13. In particular, the method 1300 comprises the following steps:

Processing starts at step 1301, in which the processor 2105 processes the coordinates of the respective point (pixel) and identifies respective first and a second radial limits of the radial gradient blend, which correspond to the respective point. The resultant data is saved in memory 2106;

In step 1310, an initial estimate g of G(x,y) is initialized and stored in $SE_g$ by the processor 2105. The value of g is dependent on the coordinates location stored in $SE_x$ and $SE_y$. If the location of the respective processed pixel is near the radius of the radial gradient blend then the processor 2105 writes the value stored in $SE_{gmax}$ to $SE_g$. If the pixel location is near the focal point, the processor 2105 writes a value of zero to $SE_g$. For all other cases the means of estimating g may involve the processor 2105 approximating Eq. 1 by a polynomial or other approximation method, or by solving Eq. 1 directly. Alternatively, the value of g written to $SE_g$ may be the corresponding value of g for a previous pixel such as an adjacent pixel.

In step 1320 the processor 2105 refines the value stored in $SE_g$ by using the method 800 described with reference to FIG. 8.

Figure 14:
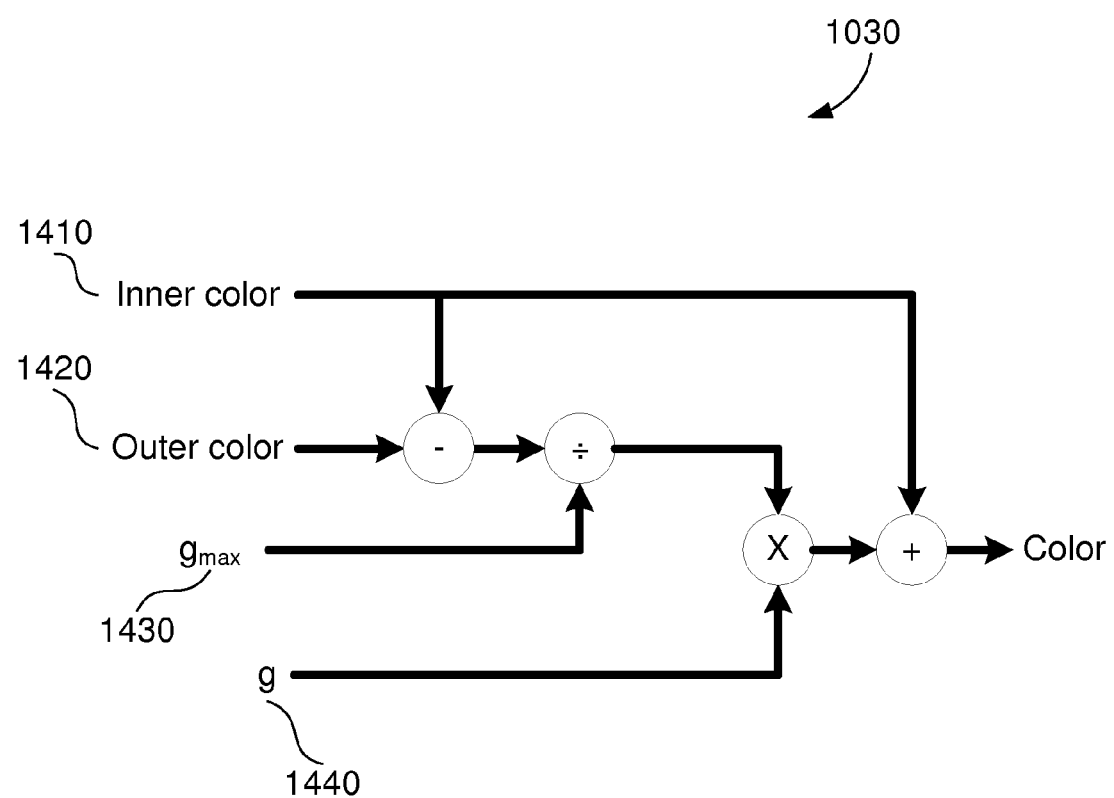
FIG. 14 shows an implementation of the method of interpolating between two colors, for a single color channel, of the block 1330 of FIG. 13.

In step 1330, processor 2105 interpolates $SE_g$ to produce the respective gradient blend interpolation value, which in the described embodiment is the color channel values of the pixel at the current coordinates and stores the determined value in $SE_{pixel}$. The interpolation method of FIG. 4 is modified to account for the range of g from zero to $G_{max}$, as shown in FIG. 14. In particular, FIG. 14 shows an implementation, effected either by way of software modules or digital logic units, of the function:

$$C(x, y) = C_0 + \frac{(C_1 - C_0)}{G_{max}} g(x, y) \qquad \text{Eq. 8}$$

Thus, in one embodiment, the processor 2105 retrieves input data 1410 to 1440 and stores the output data, in the form of the interpolated color, in $SE_{pixel}$, which may be a part of memory 2106.

It should be noted that the division of Eq. 8 may be implemented efficiently by a shift operation when $G_{max}=2^n$, n>0.

In step 1340, the processor 2105 outputs the pixel stored in $SE_{pixel}$ to the imaging device.

In step 1350, the processor 2105 checks for any remaining pixels to be rendered and continues to step 1360, if there are remaining pixels to be rendered. Else processing will terminate in step 1370;

In step 1360, the processor 2105 determines the coordinate of the next pixel and stores the coordinate in $SE_x$ and $SE_y$, before processing returns to step 1320. If there is a change of the relevant radial limits corresponding to the pixel, any location data associated with the radial limits of the next pixel will also have to be saved in respective storage elements. Otherwise, the previously entered radial limits data will be used also for the new pixel.

Alternative Embodiment

Given the linear relationship between the estimated value g and the color of a given pixel, the method of FIG. 13 may be modified to operate in a channel of a color space. An example of a channel of the color space is the red channel for RGB color space. In order to do so Eq. 1 is substituted as g into Eq. 2 to give:

$$C(x, y) = C_0 + \frac{(\Delta x_f x_f + \Delta y_f y_f) + \sqrt{r^2(\Delta x_f^2 + \Delta y_f^2) - (\Delta x_f y_f - \Delta y_f x_f)^2}}{r^2 - (x_f^2 + y_f^2)} (C_1 - C_0) \qquad \text{Eq. 9}$$

which gives the color for a channel of the color space of pixel (x, y). From Eq. 9, a decision variable may be derived using the same method as was used for G(x,y) to give:

$$D_c(x,y,c) = -(P_c x^2 + Q_c(c)x + R_c(y,c)) \qquad \text{Eq. 10}$$

where $$P_c = (C_1 - C_0)^2$$

$$Q_c(c) = Ac + B$$

where $$A = 2(C_1 - C_0)x_f$$

$$B = -2C_1(C_1 - C_0)x_f$$

$$R_c(y,c) = Cy^2 + Ec^2 + Fcy + Uy + Vc + W$$

where $$C = (C_1 - C_0)^2$$

$$E = \delta$$

$$F = 2(C_1 - C_0)y_f$$

$$U = -2C_1(C_1 - C_0)y_f$$

$$V = -2(C_1(x_f^2 + y_f^2) - C_0 r^2)$$

$$W = (C_1^2(x_f^2 + y_f^2) - C_0^2 r^2)$$

By evaluating Eq. 10 at values of c, one of which is greater than, and the other of which is less than the current estimate of C(x,y), the estimate may be corrected using the same method as was used for G(x,y). To do so, two decision variables are defined:

$$D_{cp} = D_c(x,y,c_p)$$

$$D_{cn} = D_c(x,y,c_n) \qquad \text{Eq. 11}$$

where $$c_p = c + C_{inc}, c_{inc} > 0$$

$$c_n = c - C_{dec}, c_{dec} > 0$$

c being the current estimate of the color in a single channel for a given coordinate.

Figure 15:
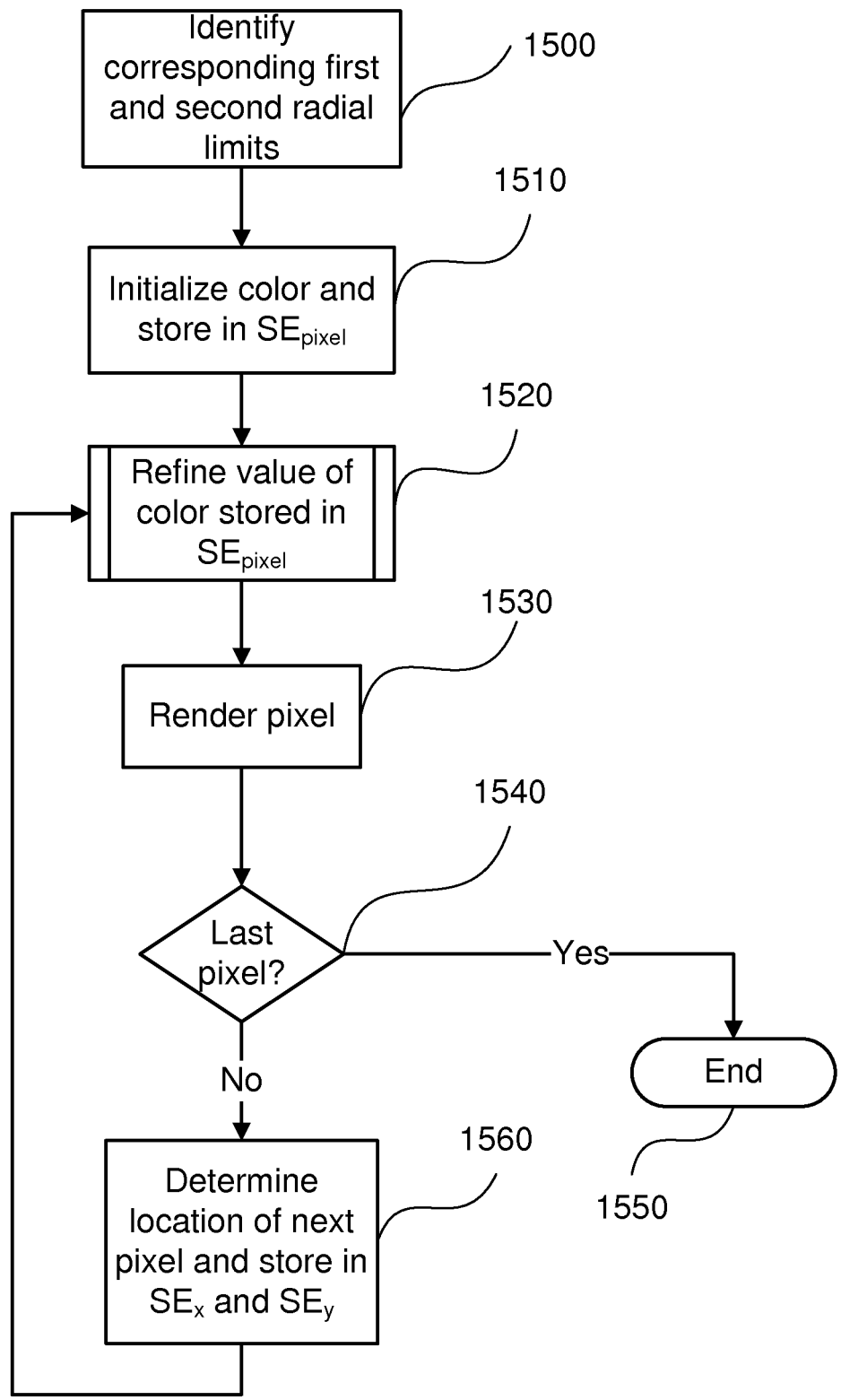
FIG. 15 shows a method of rendering a radial gradient blend by use of a decision variable to determine the color directly.
Figure 16:
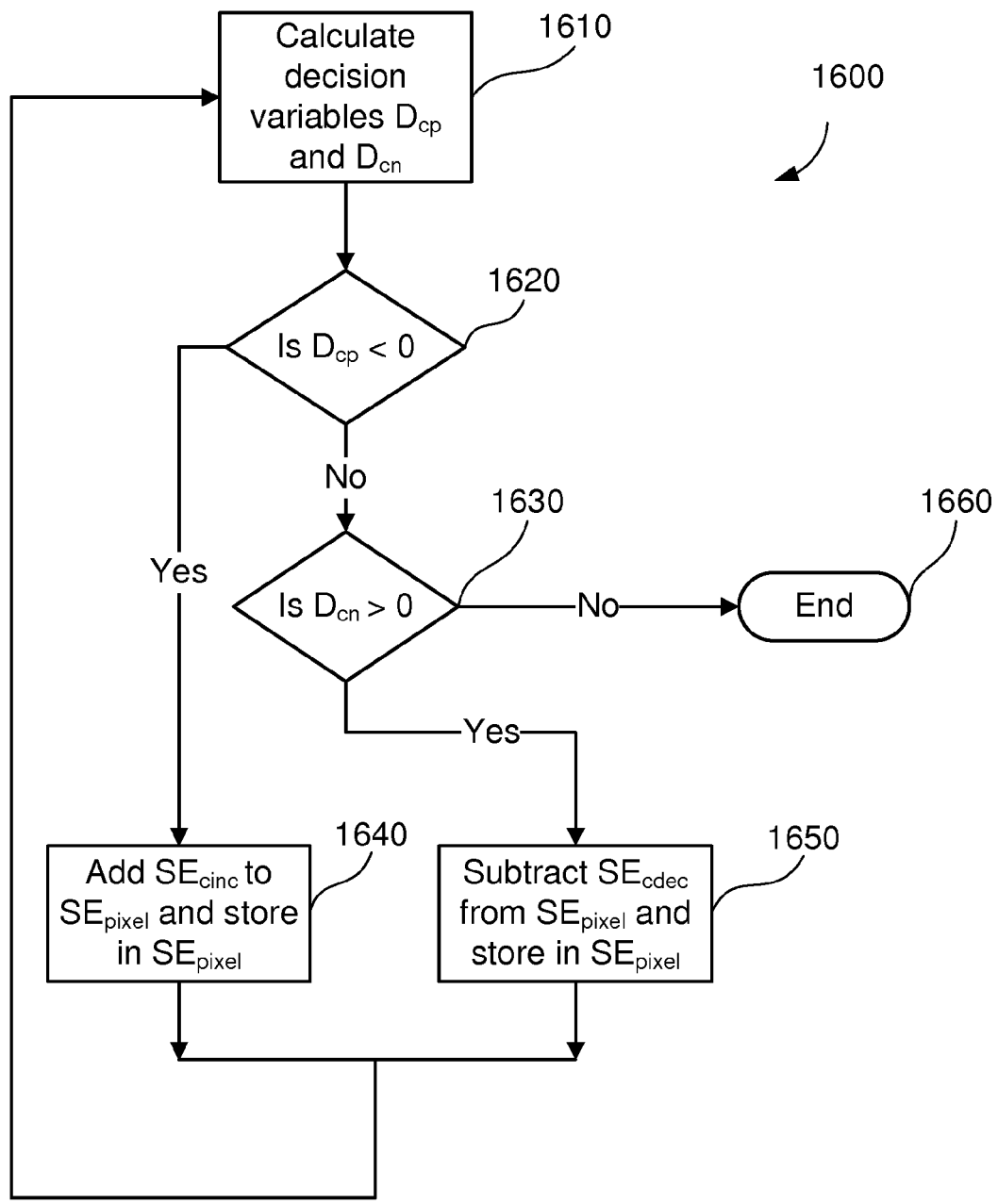
FIG. 16 shows method of refining an estimate of the color of block 1520 in FIG. 15.

Values for coordinates x and y of the current position, stored in storage elements $SE_x$ and $SE_y$, and a color at the radius and focal point, stored in $SE_{couter}$ and $SE_{cinner}$ respectively, are assumed as input to the method of FIG. 15. If further radial limits are defined, data for the radial limits relevant to the pixel, the color of which is calculated, have to also be provided as an input to the method 1500. The method 1500 of FIG. 15 comprises the following steps:

In step 1510, the estimate c of C(x,y) is initialized and stored in $SE_{pixel}$ by processor 2105. The value of c is dependent on the coordinates location stored in $SE_x$ and $SE_y$. If the coordinate is near an outer radial limit, then the processor 2105 writes the value stored in $SE_{couter}$ to $SE_{pixel}$. Similarly, if the coordinate is near an inner radial limit, then the processor 2105 writes the value stored in $SE_{cinner}$ to $SE_{pixel}$. For all other cases the means of estimating c may involve the processor 2105 approximating Eq. 9 by a polynomial or other approximation method, or by solving Eq. 9 directly. Alternatively, the processor 2105 may write to $SE_{pixel}$ the corresponding value of c for a previous coordinate;

In step 1520 the processor 2105 refines the color value stored in $SE_{pixel}$. The particular method of refining the value is shown in FIG. 16;

In step 1530 the processor 2105 effects the rendering, by outputting to the imaging device the pixel stored in $SE_{pixel}$;

In step 1540 processor 2105 continues processing to step 1560, if there are remaining pixels to be rendered, else terminates processing in step 1550;

In step 1560, the processor 2105 determines the coordinates of the next pixel and stores them in $SE_x$ and $SE_y$, and processing returns to step 1520. If there is a change of the relevant radial limits corresponding to the pixel, the processor 2105 will also have to save any location data associated with the radial limits of the next pixel in respective storage elements. Otherwise, the previously entered radial limits data will be used also for the new pixel.

The specific hardware and/or software implementation of the method 1500 shown in FIG. 15 is very similar to that of the method described with respect to FIG. 13.

The method 800 of FIG. 8 is modified to refine the color directly by use of Eq. 10, as shown in FIG. 16. The specific hardware and/or software implementation, as well as the implementation steps of the method 1600, shown in FIG. 16, are very similar to these of the method 800 of FIG. 8.

A value for c, $c_{inc}$ and $c_{dec}$ stored in storage elements $SE_{pixel}$, $SE_{cinc}$ and $SE_{cdec}$, respectively, are assumed as input to the method. In particular, the method 1600 comprises the following steps:

In step 1610 the decision variables $D_{cp}$ and $D_{cn}$, as defined by Eq. 10 and Eq. 11, are calculated by processor 2105;

In step 1620, processor 2105 verifies and, if $D_{cp}$ is less than zero, continues the processing to step 1640, else continues processing to step 1630;

In step 1630, processor 2105 verifies and, if $D_{cn}$ is greater than zero, continues the processing to step 1650, else terminates processing at 1660;

In step 1640, the processor 2105 adds the values stored in $SE_{pixel}$ and $SE_{cinc}$ together and writes the result back to $SE_{pixel}$, before returning processing to step 1610;

In step 1650, the processor 2105 subtracts the value stored in $SE_{cdec}$ from the value of $SE_{pixel}$ and writes the result back to $SE_{pixel}$, before returning processing to step 1610.

It should be noted that the above discussed calculations, which in this alternative embodiment are performed directly in the color space, have to be effected for each individual basic color. That is, for calculations in a color space such as RGB a calculation may be performed for each of the red, green and blue color channels.

Alternative Embodiment

Figure 22:
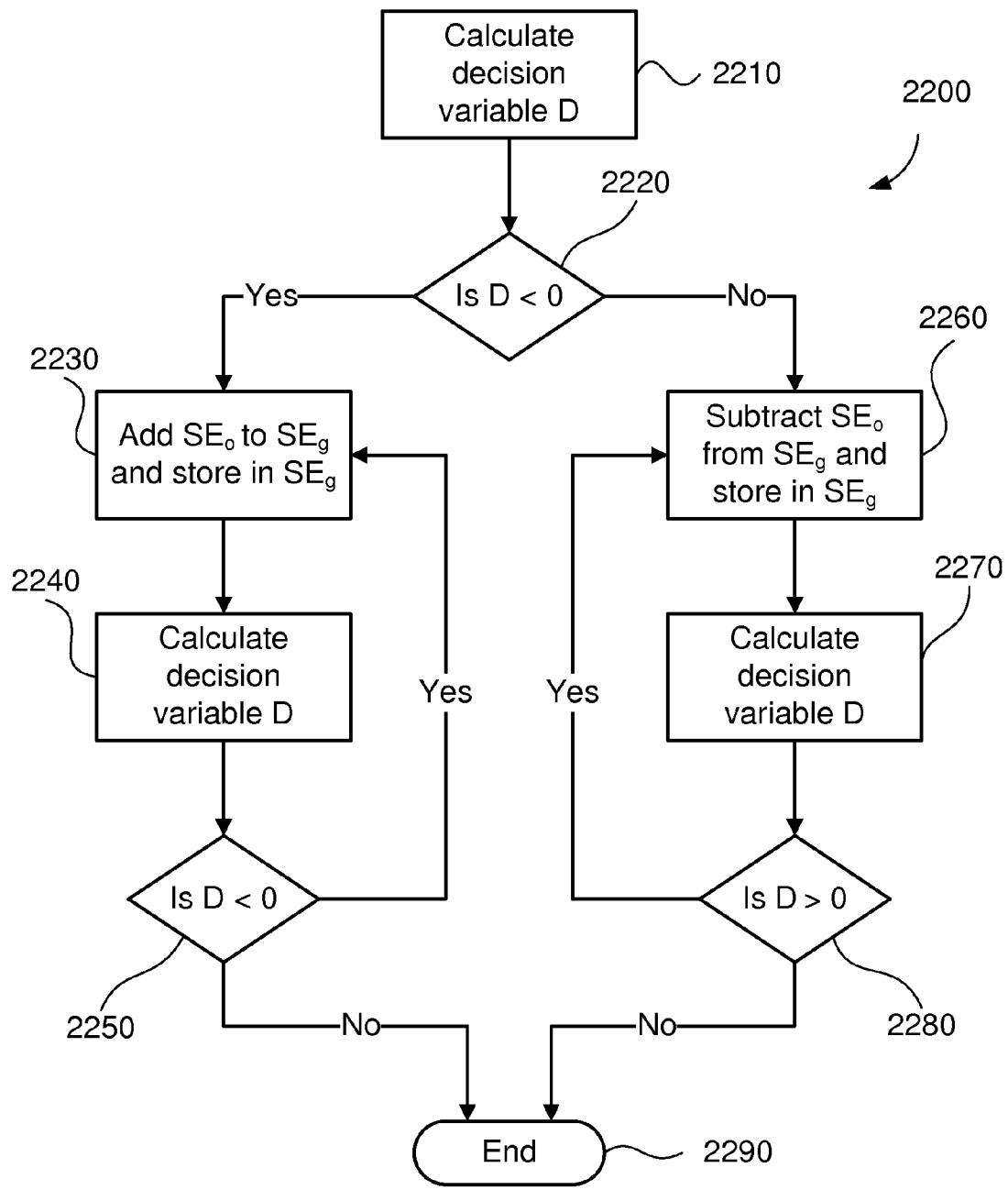
FIG. 22 shows an alternated method to that of FIG. 8 for refining an estimate of the gradient G(x,y) for a given coordinate.

The method of refining or modifying an estimate of the estimated value g as shown in FIG. 8 utilizes two decision variables, $D_n$ and $D_p$. The estimated value g may be alternatively refined by a method using a single decision variable as shown in FIG. 22. An initial estimate of the estimated value g, stored in $SE_g$, and an offset amount to increase or decrease g by, stored in $SE_o$, are assumed as input to the method of FIG. 22, which comprises the following steps:

Processing starts at step 2210, in which the decision variable D defined by Eq. 6 is calculated. The decision variable D is compared to zero in comparison step 2220. If the decision variable D is less than zero processing proceeds to step 2230. If D is greater than zero, processing continues to step 2260.

For a situation where the decision variable D is less than zero the process of FIG. 8 continues at step 2230 where the values stored in $SE_o$ and $SE_g$ are added together. The result of the addition is written back to $SE_g$.

In step 2240, the decision variable D is calculate according to Eq. 6, based on the value stored in $SE_g$.

In decision step 2250, the decision variable D is compared to zero, if the decision variable D is less than zero processing returns to adding step 2230. If the decision variable D greater than or equal to zero the value of the estimated value g is within a threshold or range of G(x, y) to G(x, y)+$SE_o$, and processing ends at stage 2290.

For the situation where the decision variable D is equal to or greater than zero the process of FIG. 8 continues at step 2260 where the value stored in $SE_o$ is subtracted from $SE_g$ and the result written back to $SE_g$.

In step 2270, the decision variable D is calculated according to Eq. 6, based on the value stored in $SE_g$.

In decision step 2280, if the decision variable D is compared to zero. If the decision variable D is greater than zero processing will return to subtraction step 2260. If the decision variable is less than or equal to zero the value of the estimated value g is within the threshold or range of G(x, y)−$SE_o$ to G(x, y), and processing ends at stage 2290.

The above method details a process to refine an estimate of the estimated value g using a single decision variable. The method may be modified to refine an estimate of the color in a single channel of a color space.

Pixel Sequential Optimization

Figure 17:
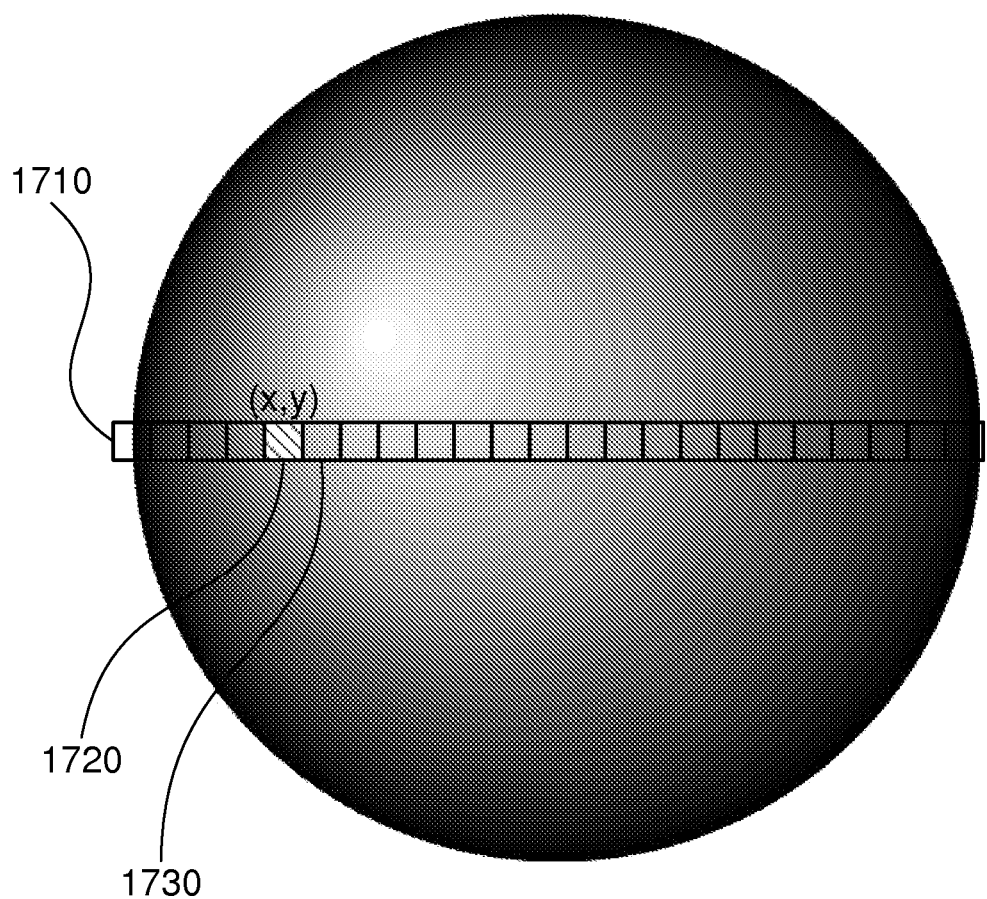
FIG. 17 shows a radial gradient blend rendered by a scan-line renderer.

The computational cost of calculating the decision variable, as defined by Eq. 6, may be further reduced when the calculation is applied to consecutive pixels of a scanline, as shown in FIG. 17. This further saving of computational time is achieved by the use of the finite differences method.

For scanline 1710 of FIG. 17, the decision variable D(x+1, y, g) of a pixel 1730, having coordinates (x+1, y), may be calculated from the value of the decision variable D(x,y,g) of the previous pixel 1720, having coordinates (x,y). That is:

$$D(x+1,y,g) = D(x,y,g) + \Delta D_x(x,g) \quad \text{Eq. 12}$$

The value of $\Delta_x D(x,g)$ is defined as:

$$\Delta D_x(x, g) = D(x+1, y, g) - D(x, y, g)$$
$$= -(2Px + P + B + Ag)$$

Similarly, to calculate the decision variable for incrementing and decrementing g by 1, the finite differences method gives:

$$D(x, y, g+1) = D(x, y, g) + \Delta D_{g+}(x, g) \quad \text{Eq. 13}$$
$$\Delta D_{g+}(x, g) = D(x, y, g+1) - D(x, y, g)$$
$$= -(Ax + 2Eg + Fy + V + E)$$
$$D(x, y, g-1) = D(x, y, g) + \Delta D_{g-}(x, g)$$
$$\Delta D_{g-}(x, g) = D(x, y, g-1) - D(x, y, g)$$
$$= Ax + 2Eg + Fy + V - E$$

Figure 18:
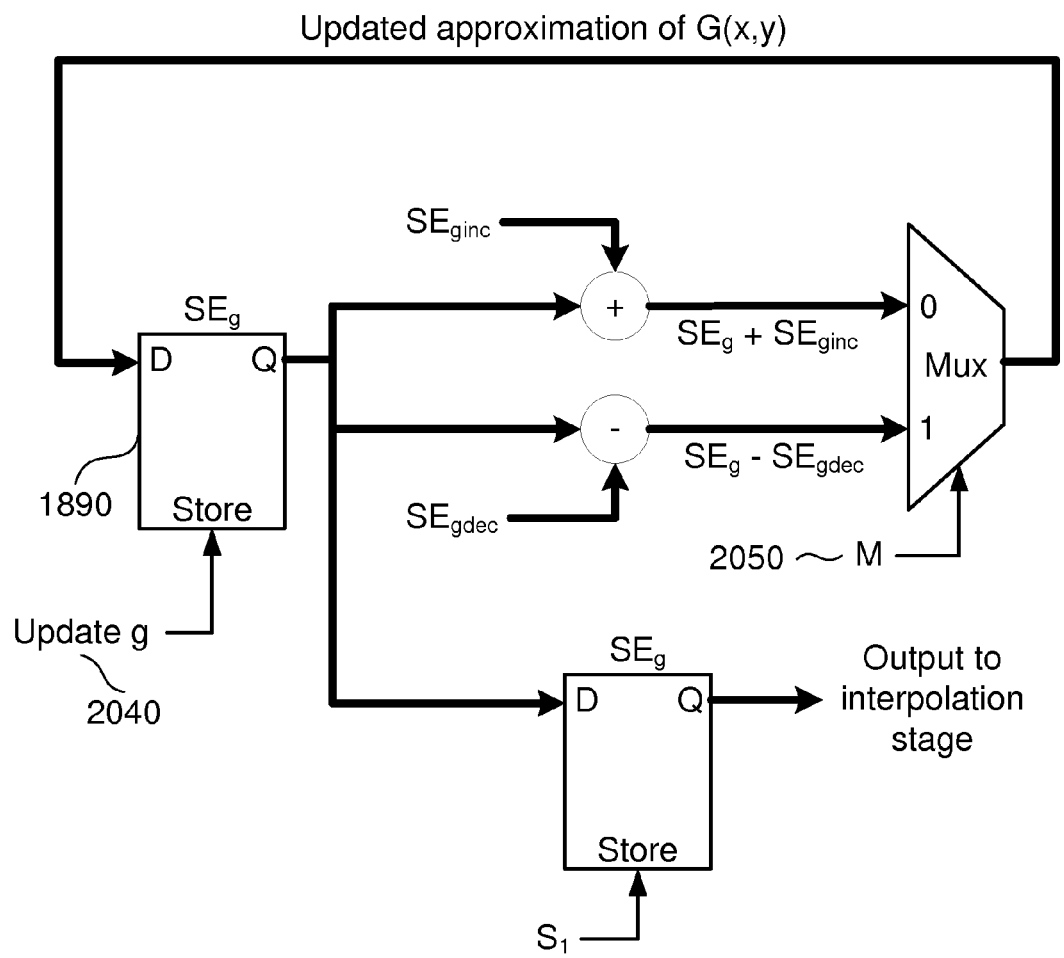
FIG. 18 shows another implementation of the 'Calculate g' block of FIG. 9, for use with the finite differences method of rendering a radial gradient blend.
Figure 19:
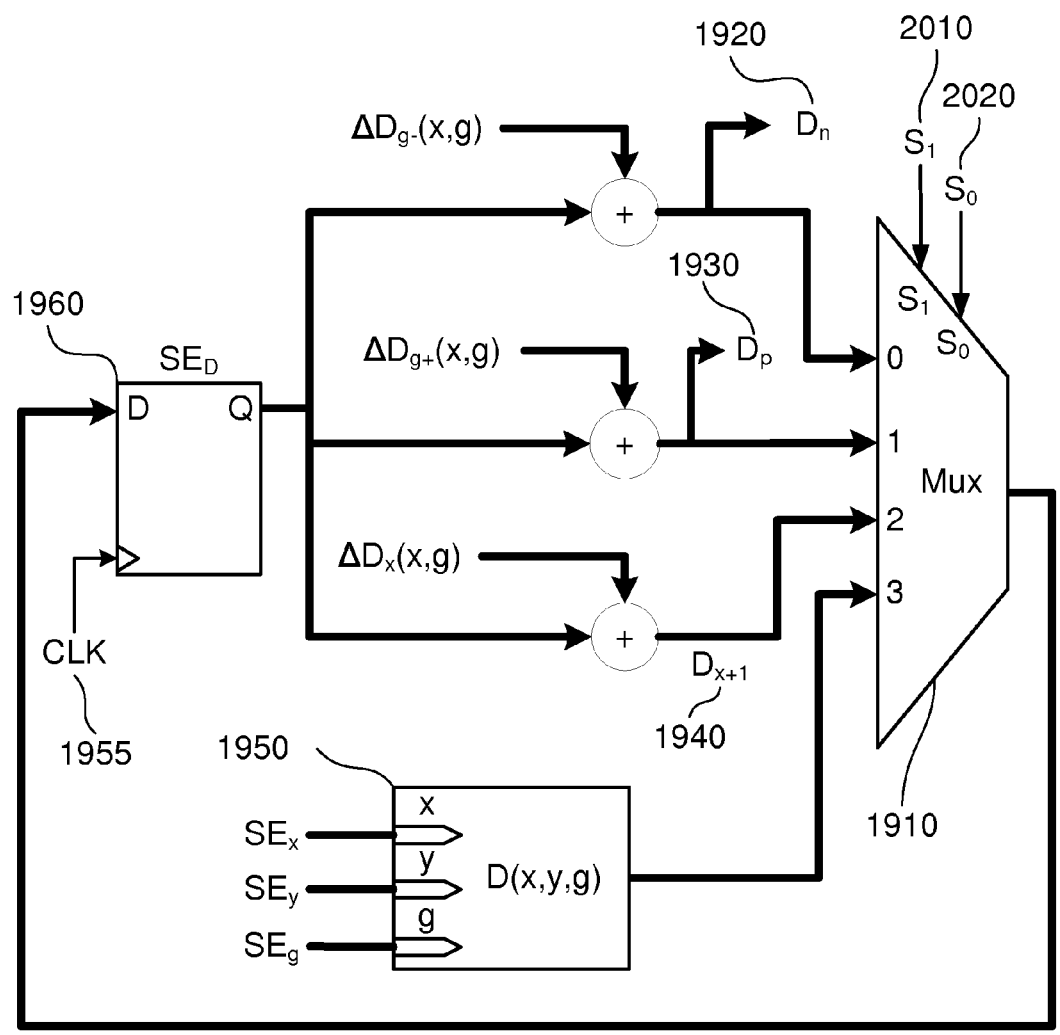
FIG. 19 shows another implementation of the 'Calculate decision variables' block of FIG. 9, for use with the finite differences method of rendering a radial gradient blend.

Based on the architecture of FIG. 9, a method to render a radial gradient blend utilizing the method of finite differences may be developed. Alternative implementations of blocks 910, 920 and 930, which are based on the method of finite differences are shown in FIG. 18, FIG. 19 and FIG. 20, respectively. Again, the particular implementations shown in these figures may be a software implementations performed by a control processor, which may be associated with the processor 2105. Alternatively, the shown implementations may be hardware based. In this case the respective implementation circuitry may include one or more dedicated digital logical units, which may be part of processor 2105.

The implementation shown in FIG. 18 is very similar to that of FIG. 11. Again, in the following description, it will be assumed that illustrated logical units may be implemented by software modules executed by processor 2105.

As shown in FIG. 19, processor 2105 executes the multiplexer software module 1910 to select the value to store in $SE_D$ 1960, based on control signals $S_1$ 2010 and $S_0$ 2020, generated by the software module shown in FIG. 20. In particular;

$S_1 = \overline{(D_p<0)+(D_n>0)}$ $S_0 = (D_n>0)+(Inc_y)$

If signal $S_1$ indicates that the error between g and G(x,y) is within the tolerance e, the processor 2105 passes the value stored in $SE_g$ to the interpolation step as shown in FIG. 13, then continues processing to the next pixel. If $S_1$ is false, signal $S_0$ indicates whether to update the decision variable for $D_p$ (1930) or $D_n$ (1920). If $S_1$ is true, signal $S_0$ indicates whether the processor 2105 should update the decision variable 1940 for the next pixel in a scanline, $D_{x+1}$, or the decision variable 1950, for the first pixel in the next scanline D(x,y,g). The clock signal CLK 1955 that drives $SE_g$, determines the rate at which g converges to G(x,y), and is required to at least equal the frequency of the pixel clock.

If now FIG. 20 is considered, signal $Inc_y$ (2030) triggers the processor 2105 to effect the increment of y to the next scanline. If signal 2050 is true, processor 2105 selects $SE_g - SE_{gdec}$ and writes the value back to $SE_g$ 1890. Else, the processor 2105 selects $SE_g + SE_{ginc}$ and writes the value back to $SE_g$ 1890. The signal 2040 for storing the update approximation to G(x,y) is true when either of the comparator software modules 2060 or 2070 outputs true.

The foregoing describes only some embodiments of the present invention and modifications and/or changes can be made thereto without departing from the scope and spirit of the invention, the embodiments being illustrative and not restrictive. For example, the methods discussed above for rendering a radial blend may be used to efficiently render other computer graphic effects. For example, the gradient function may be configured to provide for imaging effects including varying color distribution. Also the transparency of an image may be varied radially under operation of the gradient function from a focal point by using the gradient value to interpolate between predefined transparency values, thereby affording a transparency distribution. Similarly, an image may be blurred or shaded radially, such that the amount of blur (shade) applied to a pixel is a function of the distance between the pixel and a predefined focal point. Thus, the blend value estimated for each pixel by the above described methods may refer to various parameters, such as color channel values, transparency, blur, shade etc., each affording a corresponding distribution in the rendered image.

INDUSTRIAL APPLICABILITY

The foregoing description has described a computer implemented method of rendering a radial gradient blend for imaging on an imaging device. The way of determining the blend value in each point of the radial gradient blend requires no square root operation or LUT, features zero overdraw and only requires processing of the edges that bound the blend. This saves computational time and improves the efficiency of the rendering process. Accordingly, the described method and arrangements are applicable to the image processing and computer data processing industries.

We claim:

1. A computer implemented method of determining a radial gradient blend defined by a gradient function, the method comprising:

identifying respective first and second radial limits for a point of the radial gradient blend, the respective first and second radial limits having known blend values;

receiving an estimated value of the gradient function for the point;

determining a direction from the estimated value to an ideal value, wherein the ideal value is a value of the gradient function for the point and the direction of the ideal value is determined based on a sign of a decision variable associated with the estimated value;

modifying the estimated value by a predetermined amount until the ideal value is within a predetermined threshold of the modified estimated value, a direction of the modified estimated value corresponding to, the direction of the ideal value, wherein the step of determining the modified estimated value of the gradient function comprises:

defining a decision variable indicative of a difference between the received estimated value, or a subsequent modified estimate value, and the ideal value of the gradient function, in one or more steps, refining a current estimated value, by:

evaluating the decision variable for two estimated values, one of the estimated values being greater than the current estimated value by a first predetermined amount, and the other estimated value being smaller than the current estimated value by a second predetermined amount, determining the signs of the decision variable for each of the two estimated Values, and depending on the determined signs, effecting one of the following:

incrementing the current estimated value by a third predetermined amount, or decrementing the current estimated value by a fourth predetermined amount, or maintaining the current estimated value unchanged, the unchanged value in a given step determining the modified estimated value of the gradient function; and determining and storing in the computer a resultant blend value for the point by modifying one of the known blend values of the respective first and second radial limits on the basis of the modified estimated value.

2. A method according to claim 1, wherein the resultant blend value is determined by interpolating between the known blend values of the respective first and second radial limits on the basis of the modified estimated value of the gradient function.

3. A method according to claim 1, wherein the estimated value is modified by a predetermined offset and the estimated value is within the predetermined threshold when the direction from the estimated value to the ideal value changes.

4. A method according to claim 1, wherein the received estimated value of the gradient function is a determined blend value for an adjacent pixel.

5. A method according to claim 1, wherein the gradient function is associated with a ratio between the distance from the respective point to a focal point of the radial gradient blend, and the length of the line segment from the focal point of the radial gradient blend to the radius passing through the respective point.

6. A method according to claim 1, wherein the decision function is a polynomial function.

7. A method according to claim 1, wherein the gradient function relates to color distribution.

8. A method according to claim 1, wherein the gradient function relates to transparency distribution.

9. A method according to claim 1, wherein the gradient function relates to shade distribution.

10. A method according to claim 1, wherein, for a series of consecutive pixels of a scanline, the decision variable for each pixel is calculated from the value of the decision variable of the previous pixel by using a finite differences method.

11. The method according to claim 1, wherein the ideal value comprises a value of one or more integer polynomials in coordinate point coordinates.

12. A computer apparatus for rendering a radial gradient blend defined by a gradient function, the apparatus comprising a processor for executing a rendering program for rendering the blend, a memory coupled to the processor and having the rendering program recorded thereon, and a display coupled to the processor for displaying the rendered blend, said rendering program comprising:

code for identifying respective first and second radial limits for a point of the radial gradient blend, the respective first and second radial limits having known blend values;

code for receiving an estimated value of the gradient function for the point;

code for determining a direction from the estimated value to an ideal value, wherein the ideal value is a value of the gradient function for the point and the direction of the ideal value is determined based on a sign of a decision variable associated with the estimated value;

modifying the estimated value by a predetermined amount until the ideal value is within a predetermined threshold of the modified estimated value, a direction of the modified estimate value corresponding to the direction of the ideal value, wherein the step of determining the modified estimated value of the gradient function comprises:

defining a decision variable indicative of a difference between the received estimated value, or a subsequent modified estimate value, and the ideal value of the gradient function, in one or more steps, refining a current estimated value, by:

evaluating the decision variable for two estimated values, one of the estimated values being greater than the current estimated value by a first predetermined amount, and the other estimated value being smaller than the current estimated value by a second predetermined amount, determining the signs of the decision variable for each of the two estimated values and depending on the determined signs, effecting one of the following:

incrementing the current estimated value by a third predetermined amount, or decrementing the current estimated value by a fourth predetermined amount, or maintaining the current estimated value unchanged, the unchanged value in a given step determining the modified estimated value of the gradient function;

code for storing in the memory a determined blend value for the point by interpolating between the known blend values of the respective first and second radial limits on the basis of the modified estimated value of the gradient function, to render the radial gradient blend; and code for reproducing the blend value for each of the points on the display.

13. A non-transitory tangible computer readable storage medium having a program recorded thereon, the program being executable by computer apparatus to render a radial gradient blend defined by a gradient function, the program comprising:

code for identifying respective first and second radial limits for a point of the radial gradient blend, the respective first and second radial limits having known blend values;

code for receiving an estimated value of the gradient function for the point;

code for determining a direction from the estimated value to an ideal value, wherein the ideal value is a value of the gradient function for the point and the direction of the ideal value is determined based on a sign of a decision variable associated with the estimated value;

code for modifying the estimated value by a predetermined amount until the ideal value is within a predetermined threshold of the modified estimated value, a direction of the modified estimated value corresponding to the direction of the ideal value, wherein the code for determining the modified estimated value of the gradient function comprises:

code for defining a decision variable indicative of a difference between the received estimated value, or a subsequent modified estimate value, and the ideal value of the gradient function, code for, in one or more steps, refining a current estimated value, by:

evaluating the decision variable for two estimated values, one of the estimated values being greater than the current estimated value by a first predetermined amount, and the other estimated value being smaller than the current estimated value by a second predetermined amount, determining the signs of the decision variable for each of the two estimated values, and depending on the determined signs, effecting one of the following:

incrementing the current estimated value by a third predetermined amount, or decrementing the current estimated value by a fourth predetermined amount, or maintaining the current estimated value unchanged, the unchanged value in a given step determining the modified estimated value of the gradient function;

code for checking the ideal value is within a predetermined threshold of the estimated value; and code for storing a determined blend value for the point by interpolating between the known blend values of the respective first and second radial limits on the basis of the modified estimated value of the gradient function, to render the radial gradient blend.

\* \* \* \* \*